US011196569B2

(12) United States Patent
Bessonov et al.

(10) Patent No.: US 11,196,569 B2
(45) Date of Patent: Dec. 7, 2021

(54) SYSTEMS AND METHODS FOR ACCURACY AND ATTESTATION OF VALIDITY OF DATA SHARED IN A SECURE DISTRIBUTED ENVIRONMENT

(71) Applicant: BitClave PTE. LTD., Trivex (SG)

(72) Inventors: Alexander Bessonov, San Jose, CA (US); Patrick Tague, Mountain View, CA (US); Mark Shwartzman, Campbell, CA (US); Stephen Winston, San Jose, CA (US); Vadim Gore, Beaverton, OR (US)

(73) Assignee: Bitclave Pte. Ltd., Trivex (SG)

( * ) Notice: Subject to any disclaimer, the term of this patent is extended or adjusted under 35 U.S.C. 154(b) by 146 days.

(21) Appl. No.: 16/568,107

(22) Filed: Sep. 11, 2019

(65) Prior Publication Data

US 2020/0084046 A1    Mar. 12, 2020

Related U.S. Application Data

(60) Provisional application No. 62/730,426, filed on Sep. 12, 2018.

(51) Int. Cl.
*H04L 29/06* (2006.01)
*H04L 9/32* (2006.01)

(52) U.S. Cl.
CPC ............ *H04L 9/3247* (2013.01); *H04L 9/321* (2013.01); *H04L 9/3268* (2013.01); *H04L 2209/38* (2013.01)

(58) Field of Classification Search
CPC ..... H04L 9/3247; H04L 9/321; H04L 9/3268; H04L 2209/38
See application file for complete search history.

(56) References Cited

U.S. PATENT DOCUMENTS

| 8,347,093 B1* | 1/2013 | Ahmed ................... G06F 21/31 713/168 |
| 9,935,638 B1* | 4/2018 | Kakaiya ........... H03K 19/17768 |
| 10,102,526 B1* | 10/2018 | Madisetti ............. G06Q 20/389 |
| 10,243,748 B1* | 3/2019 | Callan ................... H04L 9/3263 |
| 2003/0237004 A1* | 12/2003 | Okamura ............ H04L 63/0272 726/15 |
| 2014/0040611 A1* | 2/2014 | Tenenboym .......... H04L 9/3236 713/157 |
| 2015/0372824 A1* | 12/2015 | Himawan ............... H04L 9/006 713/156 |
| 2016/0248590 A1* | 8/2016 | Benson ................ G06Q 20/382 |
| 2018/0227130 A1* | 8/2018 | Ebrahimi .............. H04L 9/3236 |
| 2019/0394041 A1* | 12/2019 | Jain ......................... H04L 63/08 |

* cited by examiner

*Primary Examiner* — Ghodrat Jamshidi
(74) *Attorney, Agent, or Firm* — Loza & Loza, LLP

(57) ABSTRACT

Systems and methods provide for validating data and attesting to its accuracy in a secure distributed environment. Encrypted data stored by a user in a datastore such as a blockchain or open public decentralized datastore can be validated by a validator. The validator is a trusted entity to whom the user provides decryption keys. Having access to the data, the validator can verify that it is accurate and can store a cryptographically signed validation certificate in the data store. Businesses engaging in transactions with the user can use the validation certificates to ensure that the user data is accurate and current.

17 Claims, 12 Drawing Sheets

SYSTEMS AND METHODS FOR ACCURACY AND ATTESTATION OF VALIDITY OF DATA SHARED IN A SECURE DISTRIBUTED ENVIRONMENT

CROSS REFERENCE TO RELATED APPLICATIONS

This patent application and claims the priority and benefit of U.S. provisional patent application No. 62/730,426, titled "ACCURACY AND ATTESTATION OF VALIDITY OF DATA SHARED IN A SECURE DISTRIBUTED ENVIRONMENT," filed on Sep. 12, 2018, which is herein incorporated by reference in its entirety.

TECHNICAL FIELD

The embodiments herein relate to public key encryption, cryptographic digital signatures, blockchains, encrypted data storage, transactions, and, more particularly, to validating data and attesting to its accuracy in a secure distributed environment.

BACKGROUND

Blockchain technology began receiving wide interest in 2008 with the popularization of the bitcoin cryptocurrency. Since then, a number of different blockchain technologies have been deployed. In general, a blockchain is a continuously growing list of records, called blocks, which are linked and secured using cryptography. By design, a blockchain is inherently resistant to modification of the data stored in the blocks. Blockchains are often described as open, distributed ledgers recording transactions in a verifiable and permanent way. This description is true for many blockchains although private blockchains and hybrid public/private blockchains have been deployed. For use as a distributed ledger, a blockchain is typically managed by a peer-to-peer network collectively adhering to a protocol for inter-node communication and validating new blocks. Once recorded, the data in any given block cannot be altered retroactively without the alteration of all subsequent blocks, which requires collusion of the network majority.

Blockchains can, as part of their specification, store and execute smart contracts. A transaction on the blockchain can store a smart contract on the blockchain. Another transaction can cause methods or subroutines within the smart contract to be executed, often writing data onto the blockchain.

An open public decentralized storage (OPDS) has properties that help ensure that data stored in the OPDS can be verified as having been stored correctly and not tampered with. The well-known Interplanetary File System (IPFS) is an example of an OPDS. "Open" indicates that the code being run to implement and maintain the OPDS is available to those who may want to audit or examine the system for errors. For example, security audits are becoming increasingly common for both open and closed source applications. The IPFS technical specs and computer code implementing those specifications is, as this document is being drafted, openly and freely available at github.com/ipfs. "Public" indicates that the datastore can be accessed by the public. Much of the data may be encrypted because there is no requirement that data in an OPDS be unencrypted, only that it can be accessed in whatever form it is stored. As such, an OPDS file may be clear text, completely encrypted, or encrypted with unencrypted header data. The IPFS can be accessed by anyone and is therefore public. The data being publicly accessible, it can be audited by third parties. For example, the IPFS has been used for botnet command and control. Security researchers can observe the botnets sending and receiving data and messages using the IPFS, but are unable to change the data or messages (a consequence of content addressability and cryptographic techniques) or to read encrypted data. The security researchers are therefor able to audit without altering. Decentralized means that the data may be stored by many network nodes and may be preserved after the loss of any one network node or even of many nodes. IPFS is decentralized in that it replicates data across network nodes and has no master node or nodes. The IPFS is a protocol and peer-to-peer network for storing and sharing data in a distributed file system using content-addressing to uniquely identify each file in a global namespace. Due to the files being content addressable, they can be stored by, duplicated by, and transferred among many IPFS nodes based on the file's address which can be based on the file's contents.

BRIEF SUMMARY

It is an aspect of the embodiments that a method for validating data and attesting to its accuracy in a secure distributed environment can be implemented using validation certificates for encrypted user data in a datastore. A plurality of user data fields can be encrypted by a plurality of user private keys to produce a plurality of encrypted user data fields. The user private keys can be kept secret by a user and never revealed. Each of the user private keys is paired with a user public key in a key pair. With a key pair, the public key can decrypt that which is encrypted with the private key. Similarly, the private key can decrypt that which is encrypted with the public key. The user can provide the encrypted user data fields to an entity. The entity, upon receiving the plurality of encrypted user data fields encrypted by the plurality of user private keys, can store then by storing the encrypted user data fields in a datastore such as a blockchain, an open public distributed storage (OPDS), or a database.

A user can receive a validation certificate in response to sending a validation request to a validator. A validation certificate certifies that the at least one requested field validated by the validation certificate is accurate and the validation certificate is cryptographically signed by the validator. The validation request is a request for a validator to validate at least one requested field. The validation request can include at least one decryption key and can specify at least one requested field. The requested field can be specified by its location, in which case the validation request can include at least one user data location at which a plurality of encrypted user data fields is located, with the at least one requested field being one of the user data fields stored in encrypted form at the user data location.

After receiving the validation request from the first entity (the user), the validator can obtain the requested field. The at least one requested field can be obtained by obtaining at least one of the plurality of encrypted user data fields from the at least one user data location, and by decrypting at least one of the plurality of encrypted user data fields to obtain the at least one requested field. The at least one decryption key, being public keys as discussed above, can be used for decrypting encrypted user data fields. The validator can proceed by validating the at least one requested field and, if successful, producing and cryptographically signing a validation certificate to obtain a digital signature, the validation certificate certifying the at least one requested field as accurate, the digital signature proving the validator digitally signed the validation certificate. Validation data can include the validation certificate and the digital signature. The validation data can be stored by storing the validation certificate in the open public decentralized storage or on the blockchain in association with the digital signature.

The validator needs access to the requested fields in order to validate the requested fields. The validator can receive access to the requested fields through an entity providing the at least one requested field to the validator in response to a data request, the data request specifying the at least one requested field, each of the at least one requested field being one of the encrypted user data fields. The requested fields can be provided to the validator in encrypted form, which is the form in which the encrypted user data fields are stored in the datastore.

As discussed above, the validator can produce validation data after validating the at least one requested field. The validation data can be provided to an entity for storage. After receiving the validation data from the validator, the entity can store it by storing the validation data in the data store.

A second entity, a business, may want to complete a transaction with the user, the transaction being dependent on certain data that is stored in the encrypted user data fields and that is validated by a trusted validator. The business can issue a certificate request requesting the validation data. The certificate request can be responded to by providing the validation data to the business.

Before providing validation data, the validity of a validation certificate can be checked. After receiving a second certificate request requesting the validation data, the validity can be checked perhaps determining that the validation certificate is invalid. The validation certificate being invalid, the correct action can be refusing to indicate the validation certificate is valid in response to the second certificate request.

A smart contract can determine that the validation certificate is invalid or if it is valid. The smart contract can be stored in an open public decentralized storage or on a blockchain maintained by a plurality of network nodes, which can also be where the validation certificate is stored. The validation certificate can be a smart contract, can be at least one smart contract, can be a plurality of smart contracts, or can contain one or more smart contracts. At least one of the smart contracts can be configured to, when executed by a blockchain VM, indicate if the validation certificate is valid. For example, a counter in the validation certificate can count the number of times that the validation certificate's validity is checked and found valid. A smart contract can provide no more than a specified number of indications that the validation certificate is valid, which can be determined based on the counter. The validation certificate can have a predetermined expiration date and a smart contract can return an "invalid" response after the expiration date. The validation certificate can include validation logic that indicates that the validation certificate is valid only if specified conditions are met. The specified conditions can include the certificate request being submitted by a specific entity, the certificate request being signed by the specific entity, or a plurality of certificate requests being submitted by no more than N entities (N being a predetermined number).

A reputation index can associate reputation scores with validators. The reputation index can be made publicly available by storing the reputation index in a blockchain or OPDS. Adjusting the reputation scores can be based on a plurality of reputation inputs. For example, a smart contract can receive the reputation inputs for a plurality of validators and, based on the reputation inputs, adjust a plurality of reputation scores up or down.

A user may desire a validation certificate for user data fields before they are stored as encrypted user data fields that can be accessed by the validator. The user may submit the user data fields directly to a validator who then produces a pre-submission validation certificate, and a pre-submission digital signature based on a validated data field. Post-validation data, which can be stored in the datastore, can include the validated data field, the pre-submission validation certificate, and the pre-submission digital signature. An entity receiving post-validation data can store it by storing the post-validation data in the data store. The validated data field can be encrypted by one of the user private keys. The pre-submission validation certificate certifies the validated data field as accurate with the pre-submission digital signature proving the validator digitally signed the pre-submission validation certificate. The validated data field is stored after the pre-submission validation certificate is received.

The validator, the business, the user, or all three can maintain a blockchain on one or more network nodes. One or more of the three entities can participate in maintaining a blockchain with other participants or can use a blockchain maintained by other network nodes. The encrypted user data, public keys, validation certificates, transaction requests, certificate requests, and other data and messages can be made publicly available by being stored on a blockchain which is maintained by a plurality of network nodes.

As discussed above, a blockchain can store the data and messages used by and exchanged while validating data and attesting to its accuracy in a secure distributed environment. Other datastores can be used instead of or in addition to the blockchain. The datastore should be selected with care because certain properties are required to ensure cryptographic auditing can be performed by the user, the verifier, and third-party auditors. A third-party auditor entrusted with at least some of the private keys can audit the methods for validating data and can attest to their accuracy in a secure distributed environment disclosed herein. An open public decentralized storage, such as the well-known interplanetary file system (IPFS), has the desired properties.

The validator, the business, the user, or all three can maintain an open public decentralized storage on one or more network nodes. One or more of the three entities can participate in maintaining an open public decentralized storage with other participants or can use an open public decentralized storage maintained by other network nodes. The encrypted user data, public keys, validation certificates, transaction requests, certificate requests, and other data and messages can be made publicly available by being stored in open public decentralized storage which is maintained by a plurality of network nodes.

A second validator can also create validation data after validating at least one desired field in response to receiving a validation request for the at least one desired field. The desired fields can be stored in the data store as encrypted user data fields. The validation data produced by the second validator can include a second validation certificate and a second digital signature, the second validation certificate certifying the at least one desired field as accurate, the second digital signature proving the second validator digitally signed the second validation certificate.

It is a further aspect of the embodiments that a computer readable medium storing computer readable instructions, that when executed on one or more processors, implements the method or methods for validating data and attesting to its accuracy in a secure distributed environment.

Non-transitory computer readable media can store data and computer readable instructions. A computer readable medium storing computer readable instructions that can be executed on one or more processors may implement a method or methods for validating data and attesting to its accuracy in a secure distributed environment.

BRIEF DESCRIPTION OF THE FIGURES

The embodiments herein will be better understood from the following detailed description with reference to the drawings, in which.

DETAILED DESCRIPTION OF EMBODIMENTS

Figure 1:
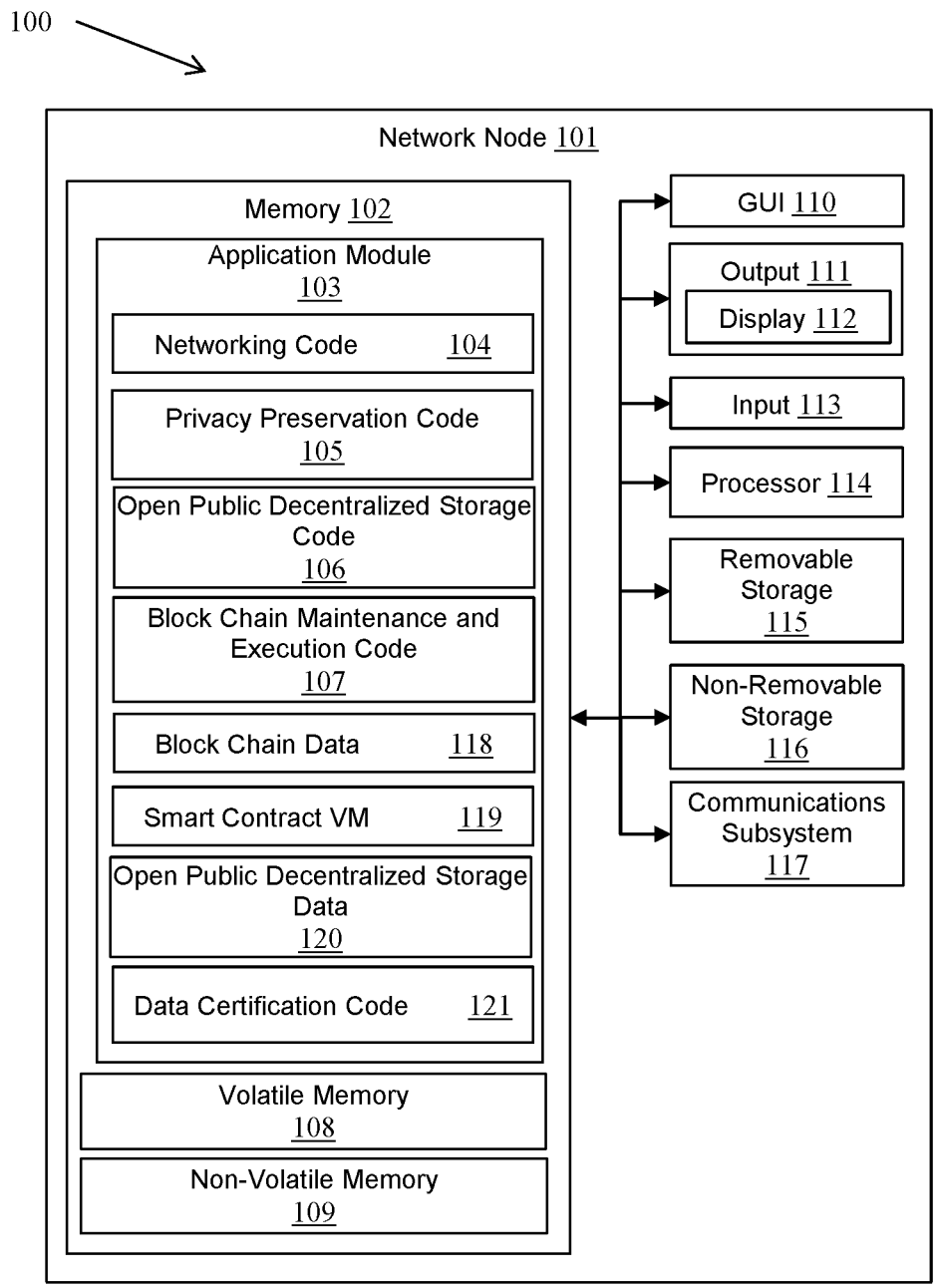
FIG. 1 is a high-level block diagram of a network node supporting systems and methods for validating data and attesting to its accuracy in a secure distributed environment, according to embodiments disclosed herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein disclose systems and methods for validating data and attesting to its accuracy in a secure distributed environment. The embodiments can be realized on the currently deployed blockchains supporting smart contracts such as BASE, Bitcoin, Ethereum, Steller, etc. BASE (BitClave Active Search Ecosystem) is a platform that allows people to store data and enable it for a specific use. In BASE there are two key actors: users and businesses. The embodiments can also be realized using an open public decentralized storage such as the interplanetary file system (IPFS). Users can build their digital persona profile in a way that directly specifies their preferences and interests. This profile is kept encrypted and no one, including BASE, can access it without the user's explicit permission. Businesses can market directly to relevant and motivated users, who match their target audience. If users agree to reveal their profile to a business, they can get compensated. The value is being transitioned directly from advertiser to user and not into the pocket of the middleman. A verifier can, in response to a user's search request, help a user respond to an offer and receive a reward.

BASE relies on blockchain for storage and management of data related to customer activities in the search ecosystem. Data can be stored in off-chain open storage like IPFS where only the hash of the data is stored on the blockchain. These activities are created by software endpoints operated by either the customers themselves or by the retailers they interact with. As such, various forms of software applications including retail websites and marketing dashboards can read to and write from the blockchain. As the BASE ecosystem is decentralized and open, anyone can create such software that interacts with the customer and publish their data to the blockchain. Of particular note, user-facing software has the capability to anonymize information contributed to the blockchain, creating what is referred to as the anonymous activity ledger. Activity anonymization is done in a way that allows only authorized parties to attribute multiple activities to the same customer. For all other parties, the data is not attributable to specific individuals (or linkable beyond certain lengths of times) while remaining valuable for statistical and data aggregation purposes. This gives the customer control over what data is allowed to be created, shared, and accessed, all managed and enforced through the use of blockchain and smart contracts.

At a high level, anonymity can be achieved by allowing a single user to post to the BASE activity ledger using a variety of unrelated pseudonyms, or alternate identities. The use of multiple identities is already supported in many blockchain platforms, as any customer can create an arbitrary number of accounts, wallets, or public key identifiers; this is already common in cryptocurrency platforms like Bitcoin. There are several reasons, beyond privacy, that a user may want to do this. For example, suppose that a user uses BASE while shopping for business needs and also for personal needs. If both of these tasks are performed using the same identity, as is typically done today through monolithic ad networks, both of these roles are combined into a single "customer profile", so the user will be shown ads that relate to both their business and personal lives. If, however, a user could create two separate personas, based on different pseudonymous identities, the search activities could be effectively isolated from each other, allowing the user to separate the ads they see based on their current role. While the different pseudonyms approach solves customer concerns with regards to anonymization, it introduces a challenge for businesses as now they need to have a way to know that two different pseudonyms asking for a service actually belong to the same person, to prevent paying out a reward twice.

In a more general sense, user-facing software can support the use of multiple pseudonyms for a user's search activities, either in support of multiple personas as above, or to truly anonymize the user's search with a different pseudonym for each activity contributed to the ledger. Even in this case, BASE supports the ability to later allow the user to selectively reveal information about these anonymous posts. Specifically, metadata can be included in the activity's fields that can later be used to reveal the true identity of the user or to reveal links between different pseudonyms (even without exposing the user's true identity), noting that both of these can be allowed selectively to only a specific list of authorized parties.

As mentioned above, users can have control over how their data is shared, including how data is shared with and by third parties. However, consumers of the data (e.g. businesses) need a mechanism to ensure that the data shared by users or other businesses is valid, trustworthy, and, in the case of time sensitive information, still relevant. The methods and systems described herein can use several mechanisms combined to achieve fully verifiable data sharing between users and businesses. These mechanisms may include: a mechanism to encrypt and protect user data and ensure it is only accessible to businesses for whom the user has granted specific permission; mechanisms to allow 3rd party service providers to independently validate and attest to the validity of the data; a mechanism for users and businesses to share data and associated certificates of validity; and a mechanism to enforce a "validity horizon" on data to ensure the data cannot be trusted and/or used when some criteria is met (e.g. time period after initial certification, max use count reached, data shared a maximum number of times etc.). All the data transactions, such as those using BASE, can be recorded in a distributed, immutable and secure ledger (e.g. Blockchain). This provides a mechanism to guarantee the origin and history of the data transactions.

Referring now to the drawings where similar reference characters may denote corresponding features consistently throughout the figures, there are shown embodiments.

FIG. 1 is a high-level block diagram of a network node supporting systems and methods for validating data and attesting to its accuracy in a secure distributed environment, according to embodiments disclosed herein. A computing device in the form of a computer 101 configured to interface with controllers, peripheral devices, and other elements disclosed herein may include one or more processing units 114, memory 102, removable storage 115, and non-removable storage 116. Memory 102 may include volatile memory 108 and non-volatile memory 109. Network node 101 may include or have access to a computing environment that includes a variety of transitory and non-transitory computer-readable media such as volatile memory 108 and non-volatile memory 109, removable storage 115 and non-removable storage 116. Computer storage includes, for example, random access memory (RAM), read only memory (ROM), erasable programmable read-only memory (EPROM) and electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage, or other magnetic storage devices, or any other medium capable of storing computer-readable instructions as well as data including blockchain data, open public decentralized storage data, and computer code.

Network node 101 may include, or have access to, a computing environment that includes input 113, output 111, and a communications subsystem 117. The network node 101 may operate in a networked environment using a communications subsystem 117 to connect to one or more remote computers, remote sensors and/or controllers, detection devices, hand-held devices, multi-function devices (MFDs), speakers, mobile devices, tablet devices, mobile phones, Smartphone, or other such devices. The remote computer may also be a personal computer (PC), server, router, network PC, RFID enabled device, a peer device or other common network node, or the like. The communication connection may include a LAN, a WAN, Bluetooth connection, or other networks.

Output 111 is most commonly provided as a computer monitor, but may include any output device. Output 111 and/or input 113 may include a data collection apparatus associated with network node 101. In addition, input 113, which commonly includes a computer keyboard and/or pointing device such as a computer mouse, computer track pad, touch screen, or the like, allows a user to select and instruct network node 101. A user interface can be provided using output 111 and input 113. Output 111 may include a display 112 for displaying data and information for a user, or for interactively displaying a GUI (graphical user interface) 110. A GUI is typically responsive of user inputs entered through input 113 and typically displays images and data on display 112.

Note that the term "GUI" generally refers to a type of environment that represents programs, files, options, and so forth by means of graphically displayed icons, menus, and dialog boxes on a computer monitor screen or smart phone screen. A user can interact with the GUI to select and activate such options by directly touching the screen and/or pointing and clicking with a user input device 113 such as, for example, a pointing device such as a mouse, and/or with a keyboard. A particular item can function in the same manner to the user in all applications because the GUI provides standard software routines (e.g., the application module 103 can include program code in executable instructions, including such software routines) to handle these elements and report the user's actions.

Computer-readable instructions, for example, program code in application module 103, can include or be representative of software routines, software subroutines, software objects, etc. described herein, are stored on a computer-readable medium and are executable by the processor device (also called a processing unit) 114 of network node 101. The application module 103 can include computer code such as networking code 104, privacy preservation code 105, open public decentralized storage code 106, blockchain maintenance and execution code 107, blockchain data 118, smart contract VM 119, open public decentralized storage data 120, and data certification code 121. A hard drive, CD-ROM, RAM, Flash Memory, and a USB drive are just some examples of articles including a computer-readable medium. The privacy preserving code 105 can include code that implements encryption, decryption, digital signing, and verification of digital signatures.

Privacy preservation code 105 can include code for asymmetric encryption, symmetric encryption, digital signatures, and for maintaining a user's private data related to the users private keys, public keys, and user data. Open public decentralized storage code 106 can maintain a local node storing open public decentralized storage data 120 for open public decentralized storage such as IPFS. Blockchain maintenance and execution code 107 can maintain a local node storing blockchain data 118 for a blockchain such as the blockchains of bitcoin, Ethereum, and BASE. A smart contract VM 119 can be an implementation of a VM defined for a blockchain that executes smart contracts that are stored on the blockchain, such as the well-known smart contract VMs for bitcoin and Ethereum. Data certification code 121 can produce validation certificates for user data.

Figure 2:
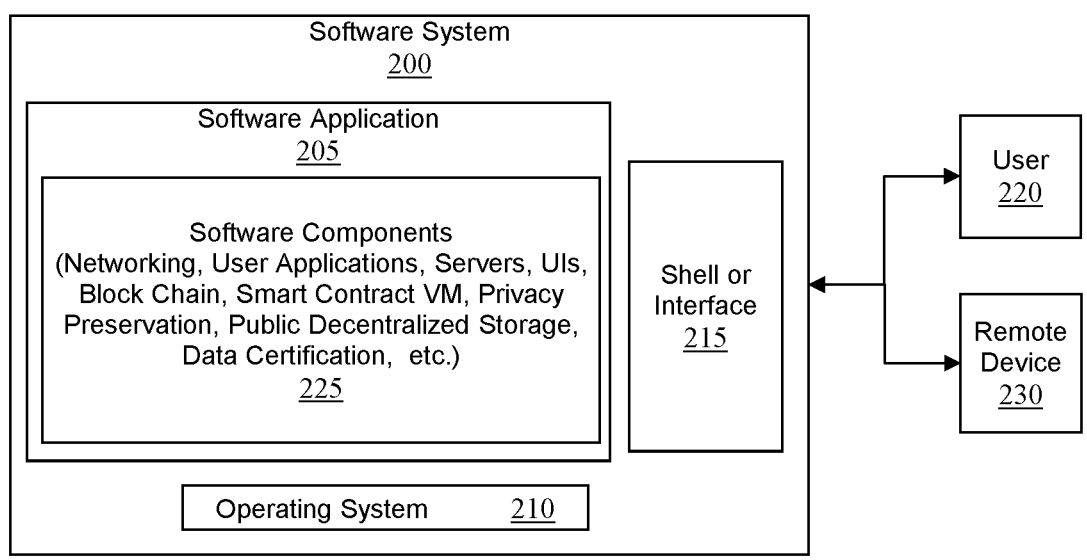
FIG. 2 is a high-level block diagram of a software system, according to embodiments disclosed herein.

FIG. 2 is a high-level block diagram of a software system 200, according to embodiments herein. FIG. 2 illustrates a software system 200, which may be employed for directing the operation of the data-processing systems such as network node 101. Software applications 205, may be stored in memory 102, on removable storage 115, or on non-removable storage 116, and generally includes and/or is associated with a kernel or operating system 210 and a shell or interface 215. One or more application programs may be "loaded" (i.e., transferred from removable storage 115 or non-removable storage 116 into the memory 102) for execution by the network node 101. An application program 205 can include software components 225 such as software modules, software subroutines, software objects, network code, user application code, server code, UI code, blockchain code, smart contract VM code, privacy preservation code, public decentralized storage code, data certification code, etc. The software system 200 can have multiple software applications each containing software components. The network node 101 can receive user commands and data through interface 215, which can include input 113, output 111, and communications connection 117 accessible by a user 220 or remote device 230. These inputs may then be acted upon by the network node 101 in accordance with instructions from operating system 210 and/or software application 205 and any software components 225 thereof.

Generally, software components 225 can include, but are not limited to, routines, subroutines, software applications, programs, objects, modules, objects (used in object-oriented programs), executable instructions, data structures, etc., that perform particular tasks or implement particular abstract data types and instructions. Moreover, those skilled in the art will appreciate that elements of the disclosed methods and systems may be practiced with other computer system configurations such as, for example, hand-held devices, mobile phones, smartphones, tablet devices, multi-processor systems, microcontrollers, printers, copiers, fax machines, multi-function devices, data networks, microprocessor-based or programmable consumer electronics, networked personal computers, minicomputers, mainframe computers, servers, medical equipment, medical devices, and the like.

Note that the terms "component" and "module" as utilized herein may refer to one of or a collection of routines and data structures that perform a particular task or implement a particular abstract data type. Applications and components may be composed of two parts: an interface, which lists the constants, data types, variables, and routines that can be accessed by other modules or routines; and an implementation, which is typically private (accessible only from within the application or component) and which includes source code that actually implements the routines in the application or component. The terms application or component may also simply refer to an application such as a computer program designed to assist in the performance of a specific task such as word processing, accounting, inventory management. Components can be built or realized as special purpose hardware components designed to equivalently assist in the performance of a task.

The interface 215 can include a graphical user interface 110 that can display results, whereupon a user 220 or remote device 230 may supply additional inputs or terminate a particular session. In some embodiments, operating system 210 and GUI 110 can be implemented in the context of a "windows" system. It can be appreciated, of course, that other types of systems are possible. For example, rather than a traditional "windows" system, other operation systems such as, for example, a real-time operating system (RTOS) more commonly employed in wireless systems may also be employed with respect to operating system 210 and interface 215. The software application 205 can include, for example, software components 225, which can include instructions for carrying out steps or logical operations such as those shown and described herein.

The description herein is presented with respect to embodiments that can be embodied in the context of, or require the use of, a data-processing system such as network node 101, in conjunction with program code in an application module 103 in memory 102, software system 200, or network node 101. The disclosed embodiments, however, are not limited to any particular application or any particular environment. Instead, those skilled in the art will find that the system and method of the embodiments may be advantageously applied to a variety of system and application software including database management systems, word processors, and the like. Moreover, the embodiments may be embodied on a variety of different platforms including Windows, Macintosh, UNIX, LINUX, Android, Arduino, and the like. Therefore, the descriptions of the exemplary embodiments, which follow, are for purposes of illustration and not considered a limitation.

Network nodes 101 and software systems 200 can take the form of or run as virtual machines (VMs) or containers that run on physical machines. As discussed here, a VM can be different from a smart contract VM and the two terms should not be used interchangeably. A VM or container typically supplies an operating environment, appearing to be an operating system, to program code in an application module and software applications 205 running in the VM or container. A single physical computer can run a collection of VMs and containers. In fact, an entire network data processing system including a multitude of network nodes 101, LANs and perhaps even WANs or portions thereof can all be virtualized and running within a single computer (or a few computers) running VMs or containers. Those practiced in cloud computing are practiced in the use of VMs, containers, virtualized networks, and related technologies.

Figure 3:
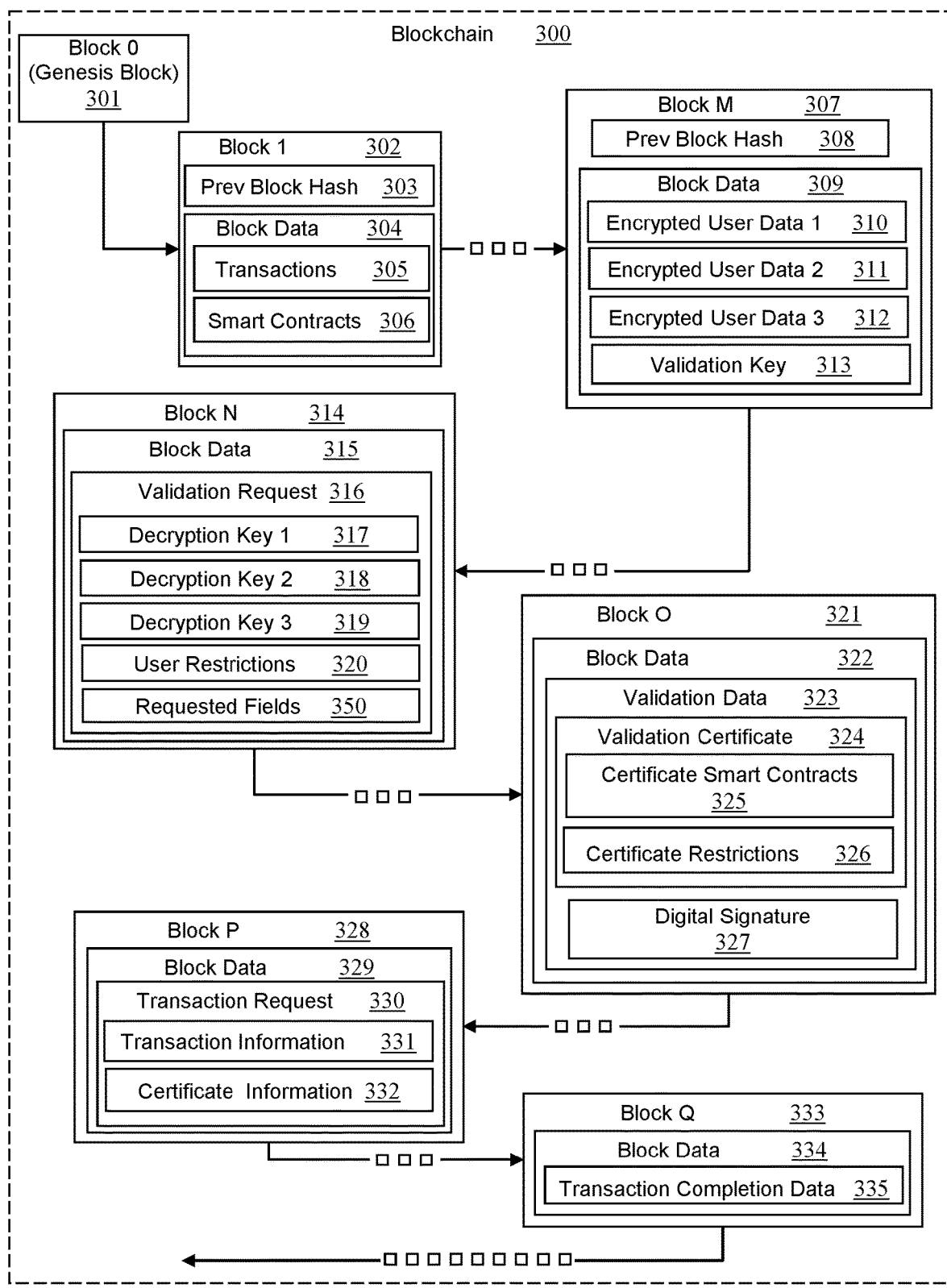
FIG. 3 is high-level block diagrams of a blockchain, according to embodiments disclosed herein.

FIG. 3 is a high-level block diagram of a blockchain 300, according to embodiments disclosed herein. The very first block, block 0 301, of a blockchain is often called the genesis block. A blockchain 300, being a sequence of blocks, block 1 302 follows block 0 301. Block 1 302 can contain a previous block hash 303, block data 304, a time stamp, and other information. Block data 304 can include transactions 305, smart contracts 306, and other data. For block 1 302, the previous block hash 303, can be the block hash of block 0 301. In many blockchains, the previous block hash is a cryptographic signing, or digital signature, of the previous block. Altering a block on a blockchain is immediately discoverable because the altered block's digital signature is different from that stored in the previous block hash of the next block. As such, the next block would also have to be altered to have the correct digital signature, changing its digital signature. It is the chain of digital signatures that makes blockchains theoretically immutable because attempting to alter one block means that every subsequent block must be altered. Such alteration can be made arbitrarily difficult or unlikely through a signing protocol such as proof-of-work, proof-of-stake, randomly selected trusted party, etc. Those familiar with blockchains or cryptocurrencies know of a variety of signing protocols.

Digital signatures can be used to digitally sign (a.k.a. cryptographically sign) data such as a previous block, a transaction, user information, etc. Most blockchains rely on one of the proven techniques for producing cryptographically secure digital signatures of data such as DSA (digital signature algorithm) developed by the National Institute of Standards and Technology, Elliptic curve DSA which is a variant of DSA, ElGamal, etc. Herein, digital signatures and cryptographic signatures refer to cryptographically secure signatures of data. A digital signature for specific data can be produced from the data and a private key. A digital signature can be verified using the data and a public key. Note that the data must be available in order to verify it using the public key. With respect to digital signatures, the private key is often called a signing key while the public key is often called a validation key.

Digital signatures (also called cryptographic signatures) are different from data encryption because in data encryption the data is encrypted with an encryption key and therefor unreadable without a decryption key. Digital signatures sign data, encrypted or unencrypted, such that the signature can be verified using the signer's public key and the signed data. Encryption transforms the data into encrypted data that is unreadable without a decryption key. In practice, data is encrypted using one of the proven data encryption techniques such as the Advanced Encryption Standard (AES), Blowfish, Twofish, Serpent, etc. Asymmetric encryption techniques use a key pair, two keys often called a private key and a public key, with one key decrypting what the other key encrypts. Symmetric techniques use a single key that both encrypts and decrypts.

Returning to FIG. 3, the blockchain has a plethora of blocks. The arrows overlaid by tiny blocks, such as the arrow between block 1 302 and block M 307, indicate that there can be many intervening blocks. Following block M 307 on the blockchain 300 are block N 314, block O 321, block P 328, and block Q 333. Block M 307 is shown including the block M-1 block hash 308 and block data 309. The block data 309 includes encrypted user data 1 310, encrypted user data 2 311, encrypted user data 3 312, and validation key 313. The validation key is shown as an example of the blockchain storing validation keys for digital signatures, such as the validator's digital signatures.

The block data 315 of block N 314 is illustrated as including a validation request 316. Validation request 316 is illustrated as including decryption key 1 317, decryption key 2 318, decryption key 3 319, user restrictions 320, and a specification of the requested fields 350. Recalling that the encrypted user data fields 310, 311, 312 are encrypted with private keys kept secret by the user, the decryption keys 317, 318, and 319 can decrypt the encrypted user data fields. The user restrictions specify restriction that the user wants on the validation certificate, such as what business can receive the validation certificate. A requested field can be a user data field that is to be validated. The requested fields specifier 350 indicates which of the encrypted user data fields are to be validated and can specify where the relevant encrypted user data fields are located or how to find them.

Data block 322 of block O 321 is illustrated as including validation data 323. The validation data 323 can include a validation certificate 324 and a digital signature 327. The validation certificate 324 can include certificate smart contracts 325 and certificate restrictions 326. The certificate restrictions 326 can specify when the validation certificate is valid and for whom it is valid. Data block 329 of block P 328 is illustrated as containing a transaction request 330. The transaction request 330 can contain transaction information 331 and certificate information 332. The transaction information 331 can identify the user and user data needed for a transaction. The certificate information 332 can specify one or more validation certificates needed for validating transaction information 331. Data block 334 of block Q 333 is illustrated as including transaction completion data 335. The transaction completion can indicate that a transaction is complete. For example, a receipt for a purchase indicates a transaction is complete.

Figure 4:
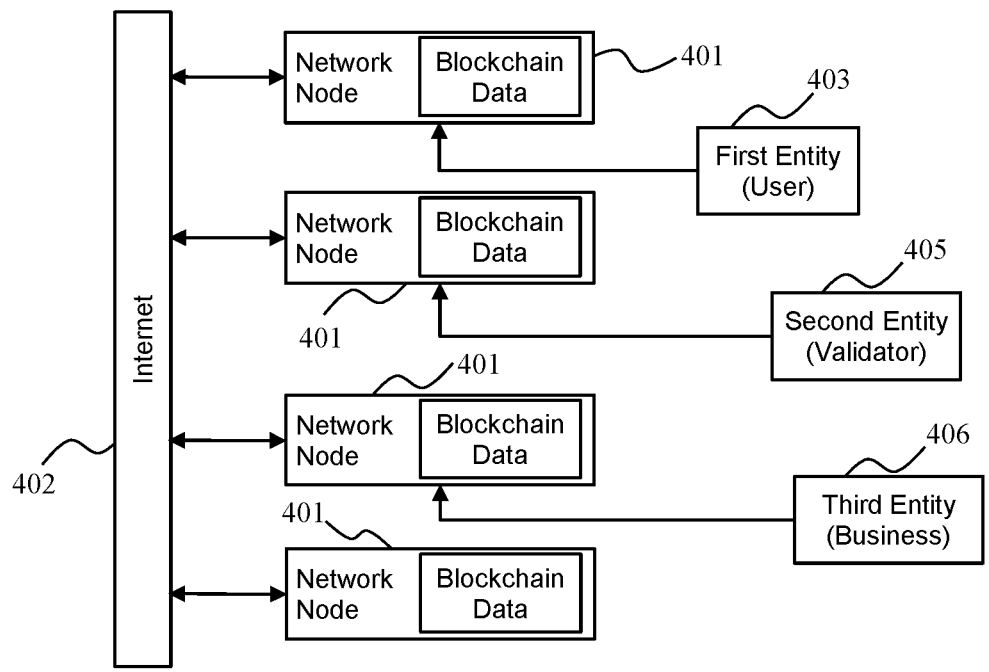
FIG. 4 depicts network nodes maintaining a blockchain, according to embodiments disclosed herein.

FIG. 4 depicts network nodes 401 maintaining a blockchain, according to embodiments disclosed herein. The network nodes 401 are illustrated as being able to communicate via the internet 402 and as having blockchain data. Blockchains are commonly maintained by many network nodes 401 with each maintaining its own version of the blockchain. In a trustless environment, the network nodes do not trust each other to have accurate copies of the blockchain and therefor process and store each block as it is signed. The blockchain maintenance and execution code 107 run by the network nodes 401 can be different programs written to implement a published standard for the blockchain. The smart contract VM 119 run by the network nodes 401 can implement a standardized VM specified for the blockchain. Note that the smart contract VM 119 can be considered to be executable code within the blockchain maintenance and execution code 107 of the network nodes 401. The smart contracts are executable code that can be executed by a smart contract VM. For example, an entity can enter a transaction on the blockchain 300 that provides input data to and invokes a method or subroutine within the smart contract. The smart contract VM can run the method or subroutine using the input data and can store the result on the blockchain. Those practiced in the art of blockchain distributed applications (dApps) are familiar with writing, deploying, accessing, transacting with, and interacting with smart contracts.

The first entity 403 is shown interacting with one of the network nodes 401. The second entity 405 is also shown interacting with one of the network nodes 401. In addition, the third entity 406 is shown interacting with one of the network nodes 401. By interacting with the network nodes 401, the entities 403, 405, 406 can submit data and transactions for storage on the blockchain and can obtain data stored on the blockchain. Some of the data and transactions stored on the blockchain can be processed by smart contracts that store output data on the blockchain.

Figure 5:
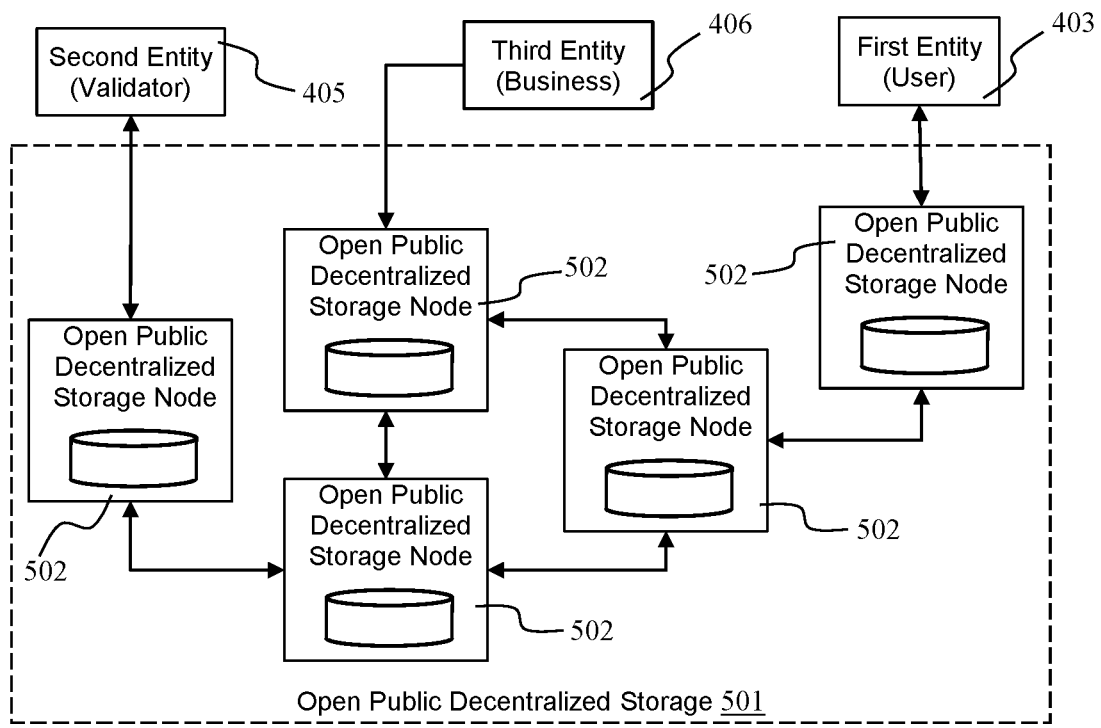
FIG. 5 depicts network nodes maintaining an open public decentralized storage, according to embodiments disclosed herein.

FIG. 5 depicts network nodes 502 maintaining an open public decentralized storage (OPDS) 501, according to embodiments disclosed herein. The validator 405, the business 406, and the user 403 can access the OPDS 501 through OPDS network nodes 502 to thereby read data from or write data to the ODPS.

Figure 6:
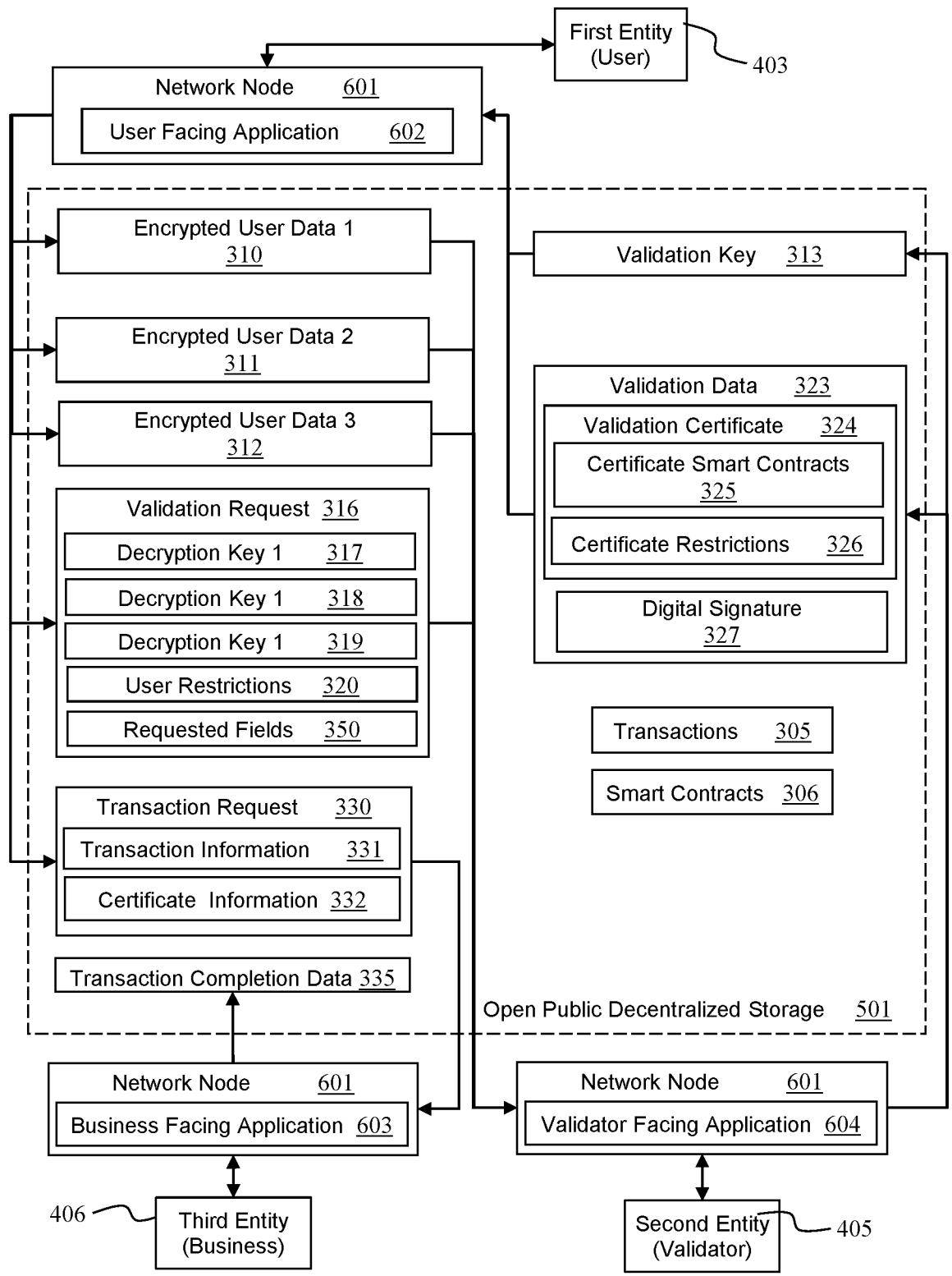
FIG. 6 is a high-level block diagram of an open public decentralized storage storing data and communications, according to embodiments disclosed herein.

FIG. 6 is a high-level block diagram of an open public decentralized storage 501 storing data and communications, according to embodiments disclosed herein. In FIG. 6, the OPDS 501 is storing the data and communications that are illustrated as stored in the data blocks of blockchain 300 of FIG. 3. The directions of the arrows indicate which entity is storing and which entity is reading the data and communications. The OPDS being public, any entity can read the data and communications. However, in order to perform the methods of the embodiments, the business 406 uses a business facing application 603 running on a network node 601 to receive the transaction request 330 stored in the OPDS 501. The user 403 uses a user facing application 602 running on a network node 601 to receive the data and communications on the right side of the OPDS 501. The validator 405 uses a validator facing application 604 running on a network node 601 to receive the data and communications on the left side of the OPDS 501. Transaction completion data 335 is shown as being stored by the business 406 but going unread. The reason is that the appropriate arrow would cause confusion in the drawing. As such, it is understood that the user can read the transaction completion data 335, but by ignoring it may be doing a digital equivalent of throwing away the sales receipt.

Figure 7:
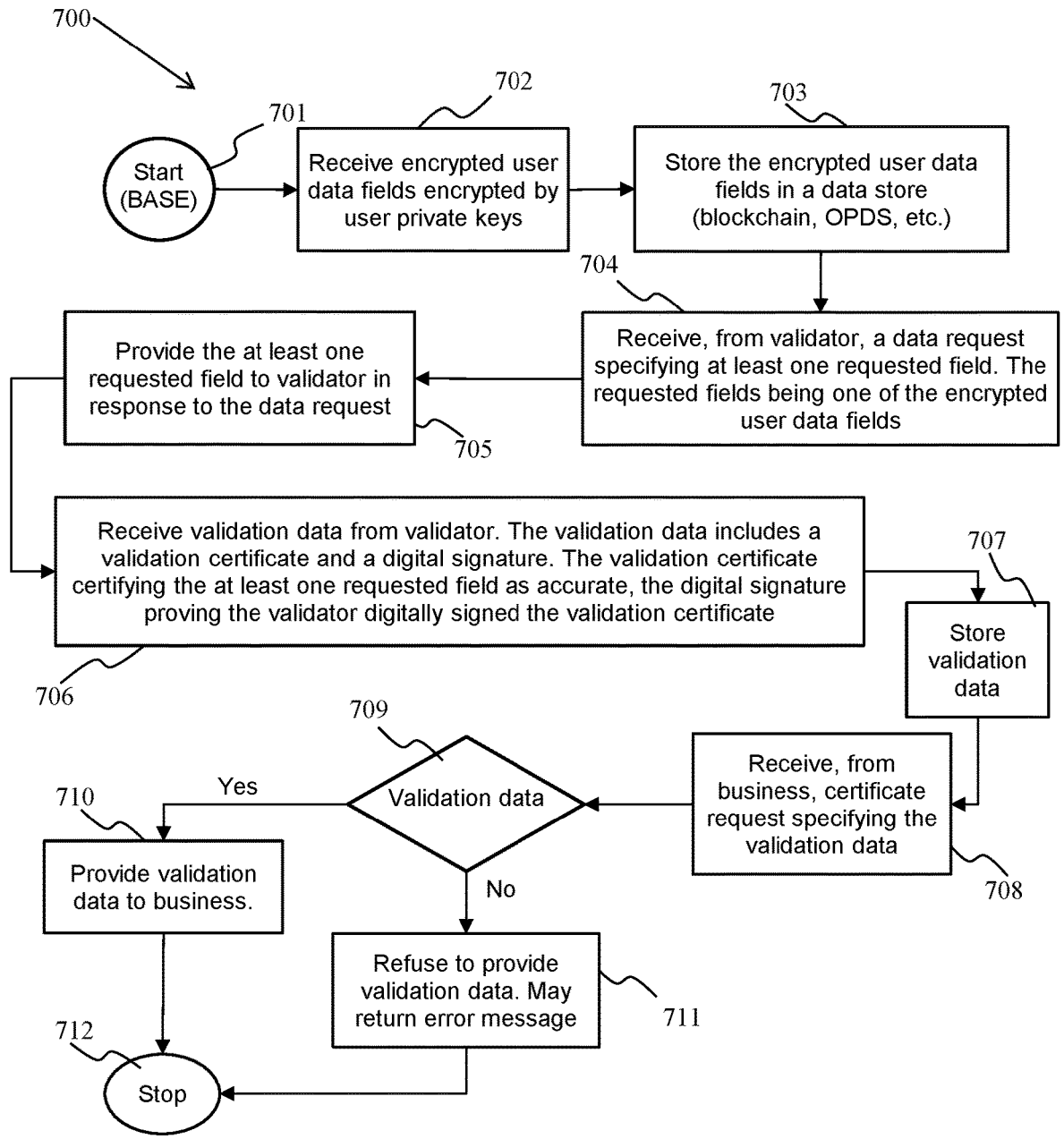
FIG. 7 is a flow chart illustrating an example, from the perspective of entity operating and maintaining a datastore, of a method for validating data and attesting to its accuracy in a secure distributed environment, according to embodiments disclosed herein.

FIG. 7 is a flow chart illustrating an example, from the perspective of an entity operating and maintaining a datastore such as BASE, of a method for validating data and attesting to its accuracy in a secure distributed environment 700, according to embodiments disclosed herein. After the start 701, encrypted user data fields encrypted by user private keys are received 702. In response to receiving the encrypted user data fields encrypted by user private keys, the encrypted user data fields encrypted by user private keys are stored 703 in a blockchain, OPDS, database, or other storage. A data request can be received from a validator 704. The data request can specify at least one requested field, the requested fields being one of the encrypted user data fields. In response to the data request, the requested data fields can be provided to the validator 705. Validation data can be received from the validator 706 and stored 707. The validation data can include a validation certificate and a digital signature, the validation certificate certifying the at least one requested field as accurate, the digital signature proving the validator digitally signed the validation certificate. A certificate request can be received from a business, the certificate request specifying the validation data 708. The validity of the validation certificate can be checked 709. If the validation certificate is not valid, providing the validation data to the business can be refused and an error message may be returned to the validator 711 before the process stops 712. If the validation certificate is valid, the validation data can be provided to the business 710 before the process stops 712.

Figure 8:
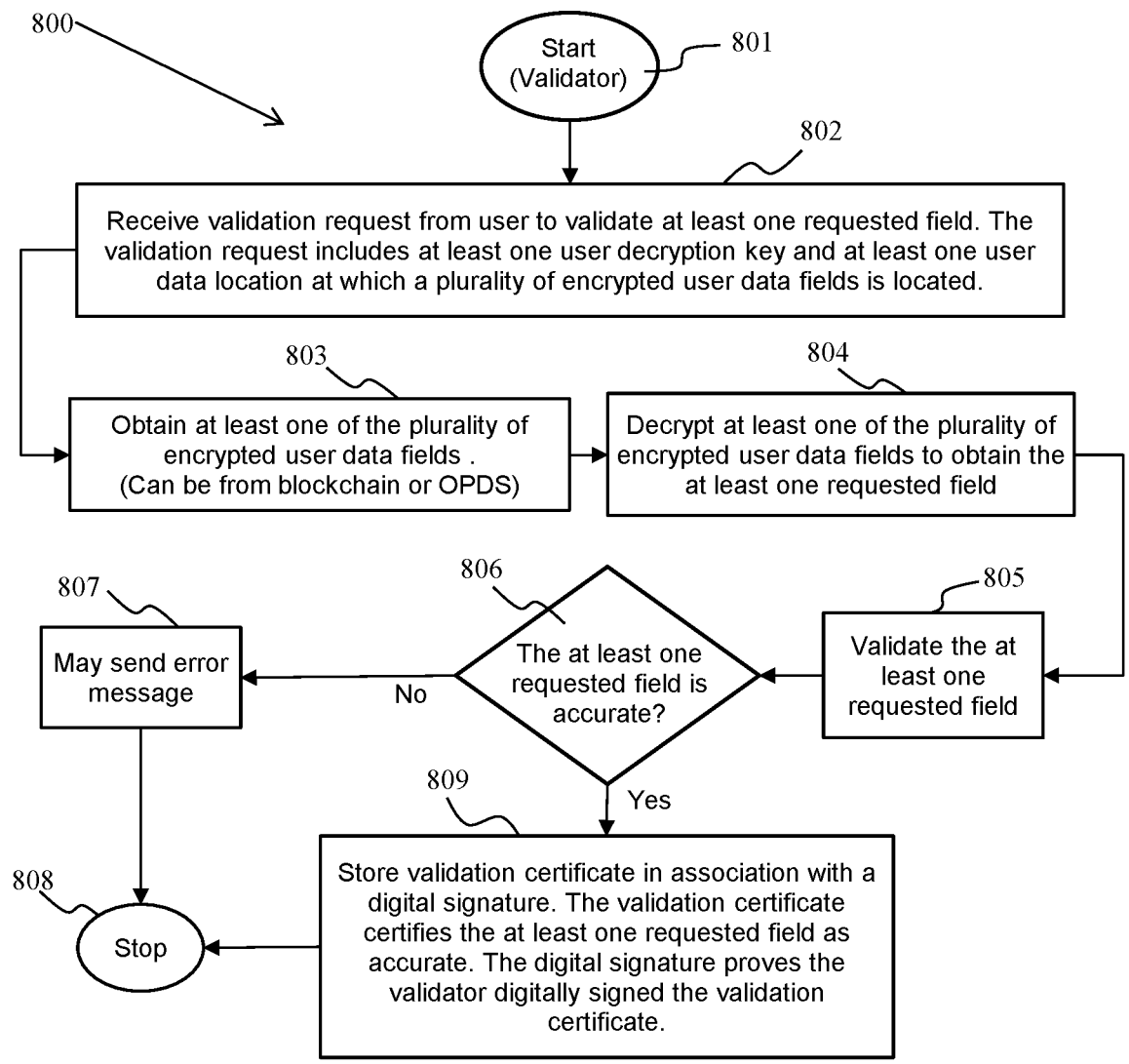
FIG. 8 is a flow chart illustrating an example, from a validator's perspective, of a method validating data and attesting to its accuracy in a secure distributed environment, according to embodiments disclosed herein.

FIG. 8 is a flow chart illustrating an example, from a validator's perspective, of a method validating data and attesting to its accuracy in a secure distributed environment 800, according to embodiments disclosed herein. After the start 801 a validation request can be received 802. A user may be requesting validation of at least one requested field. A requested field can be a user data field that is to be validated. The validation request can include at least one user decryption key and at least one user data location at which a plurality of encrypted user data fields is located. The encrypted user data fields can be obtained 803 and decrypted 804 to obtain the requested data fields.

The requested data fields are validated as accurate 805. It is through validation of the requested fields that the validator adds value to the methods described herein. Validation can be performed easily by checking proprietary databases, government databases, etc. Validation can be difficult and slow when, for example, a detective must be hired to investigate the user to determine if the requested data is accurate. If the requested data is not accurate, an error message may be sent to the user 807 before the method stops 808. Otherwise, a validation certificate can be produced and stored in association with a digital signature 809 before the method stops 808. A validation certificate certifies the at least one requested field as accurate. The digital signature proves the validator digitally signed the validation certificate. A validation certificate can be obtained by digitally signing the requested fields.

FIGS. 9-18 illustrate a number of short processes as are commonly used in asynchronous processing or event driven processing. Smart contracts can be written to contain short processes to thereby avoid having to wait for input. In contrast, the methods of FIGS. 7 and 8, could have wait states such that the methods wait at certain points for input to be received. One practiced in the programming arts is familiar with implementing processes as synchronous, possibly with wait states, or as asynchronous, possibly event driven. Based on FIGS. 9-18, it is clear that the methods described herein can, to a large extent, be performed by smart contracts.

Figure 9:
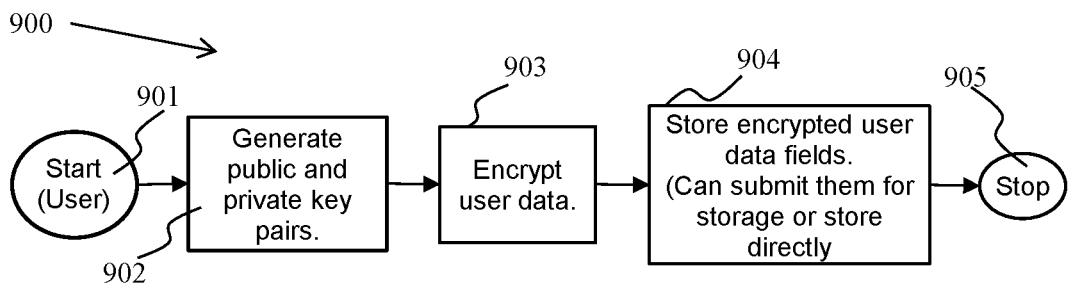
FIG. 9 is a flow chart illustrating an example of method for a user storing encrypted data fields, according to embodiments disclosed herein.

FIG. 9 is a flow chart illustrating an example of method for a user storing encrypted data fields 900, according to embodiments disclosed herein. After the start 901, key pairs are generated 902, user data is encrypted 903, and the encrypted user data fields are stored 904 before the method stops 905. The key pairs have two keys, a private key and a public key. The user data can be encrypted with private keys that the user keeps secret forever. The user data fields can be decrypted using public keys, which the user can share as the user sees fit. The user can store the encrypted user data fields by directly accessing the datastore or by submitting them for storage such that another entity or perhaps a smart contract directly stores the encrypted user data fields.

Figure 10:
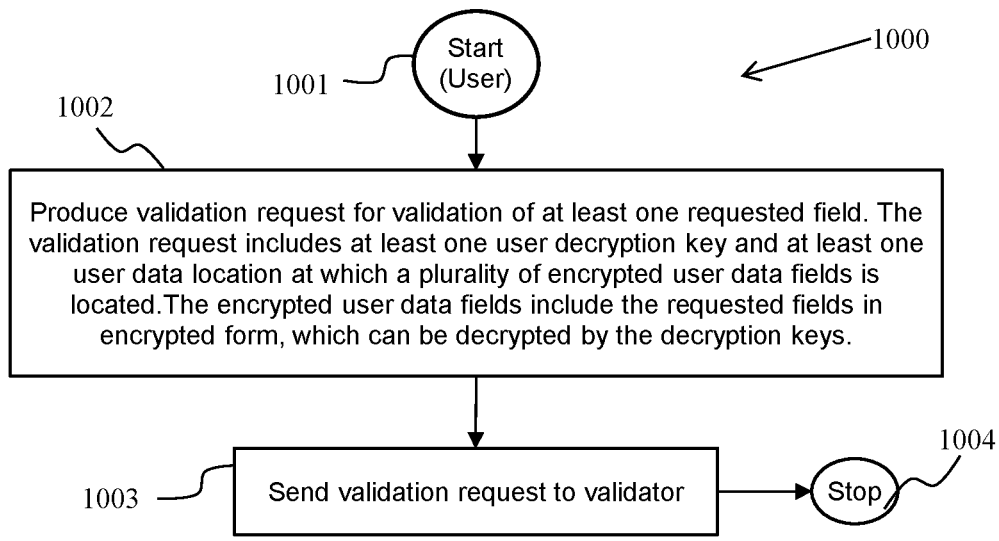
FIG. 10 is a flow chart illustrating an example of a method for a user to produce a validation request, according to embodiments disclosed herein.

FIG. 10 is a flow chart illustrating an example of a method for a user to produce a validation request 100, according to embodiments disclosed herein. After the start 1001, a validation request can be produced as discussed above 1002 and sent to a validator 1003 before the method stops 1004.

Figure 11:
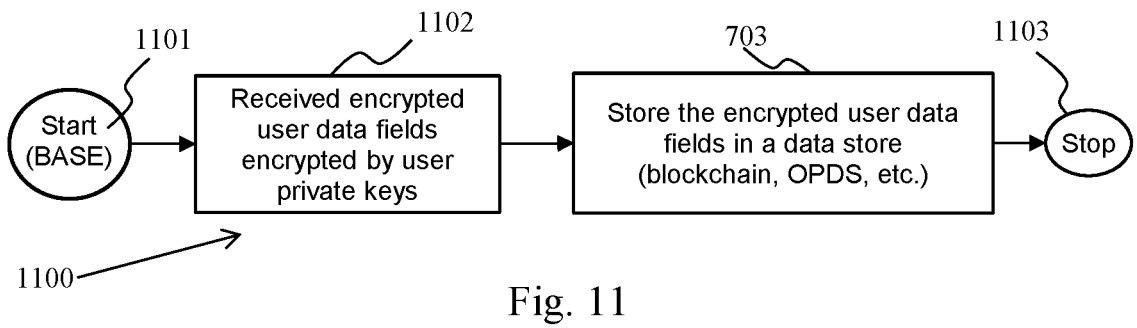
FIG. 11 is a flow chart illustrating an example of a method for storing encrypted user data fields, according to embodiments disclosed herein.

FIG. 11 is a flow chart illustrating an example of a method for storing encrypted user data fields 1100, according to embodiments disclosed herein. After the start, having received the encrypted user data fields 1102 the encrypted user data fields are stored by storing the encrypted user data fields 703 before the method stops 1103. The phrase "having received" indicates that the method may be event driven and may have been started in response to having received data or a message, such as having received the encrypted user data fields.

Figure 12:
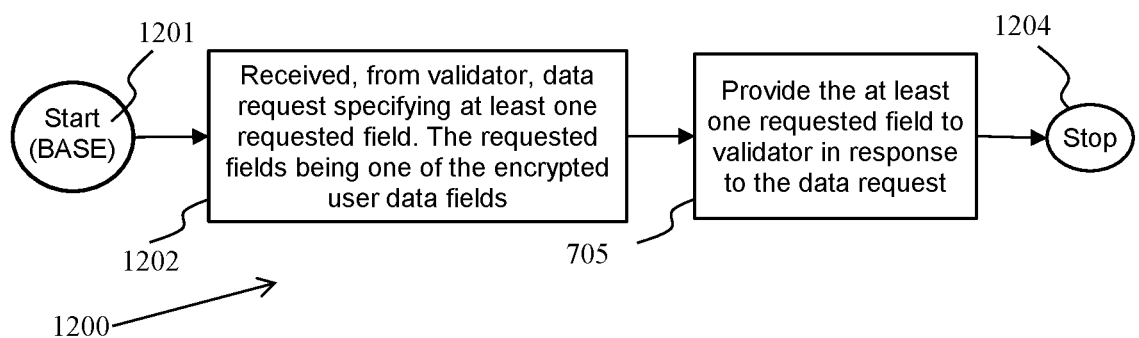
FIG. 12 is a flow chart illustrating an example of a method for providing a validator with requested data fields, according to embodiments disclosed herein.

FIG. 12 is a flow chart illustrating an example of a method for providing a validator with requested data fields 1200, according to embodiments disclosed herein. After the start 1201, having received a data request 1202 for at least one requested data field, the requested data fields are provided to the validator 705 before the process stops 1204. The requested data fields can be provided in encrypted form which is the form in which the user data fields are stored by the datastore. As discussed above, the requested fields are one or more of the user data fields that are stored in the datastore as encrypted user data fields.

Figure 13:
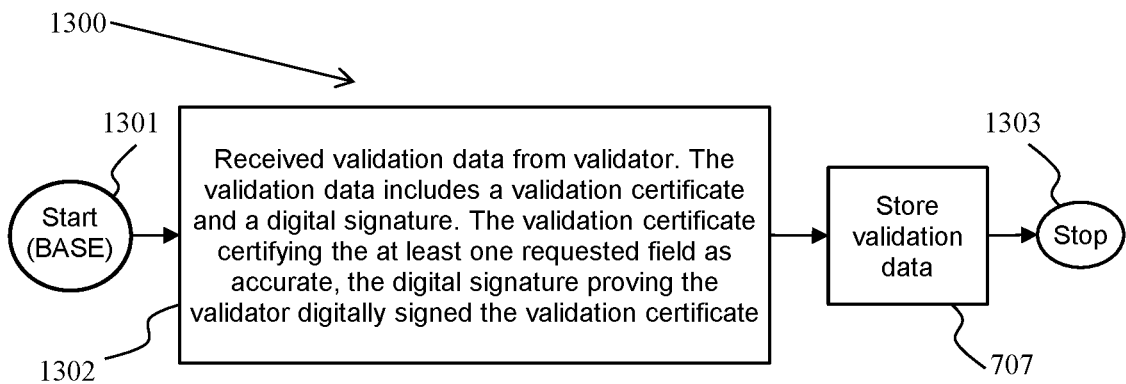
FIG. 13 is a flow chart illustrating an example of a method for storing validation data, according to embodiments disclosed herein.

FIG. 13 is a flow chart illustrating an example of a method for storing validation data 1300, according to embodiments disclosed herein. After the start 1301, having received validation data from the validator 1302 the validation data is stored 707 before the process stops 1303.

Figure 14:
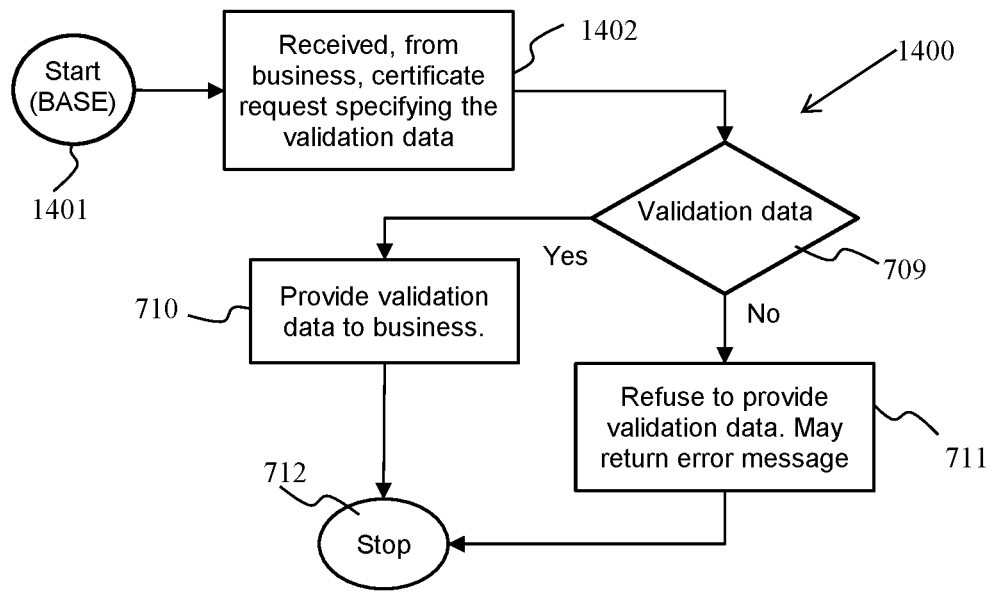
FIG. 14 is a flow chart illustrating an example of a method for checking the validity of a validation certificate, according to embodiments disclosed herein.

FIG. 14 is a flow chart illustrating an example of a method for checking the validity of a validation certificate 1400, according to embodiments disclosed herein. After the start, having received a certificate request from a business 1402, the validation data is checked for validity 709. The validation data can include a validation certificate and a digital signature. Checking the validity of the validation data can include using the digital certificate to ensure that a trusted validator signed the validation certificate. Checking the validity of the validation data can also include ensuring that the certificate restrictions are obeyed and that none of the certificate restrictions indicate that the validation certificate is invalid. As discussed above, checking the validity of the validation data can be performed by smart contracts. If the validation data is valid, it may be provided to the business 710 before the process stops 712. Otherwise, the method refuses to provide the validation data and may instead return an error message to the business 711, before the method stops 712. The method can refuse to provide the validation data by stopping or not sending anything to the business.

Figure 15:
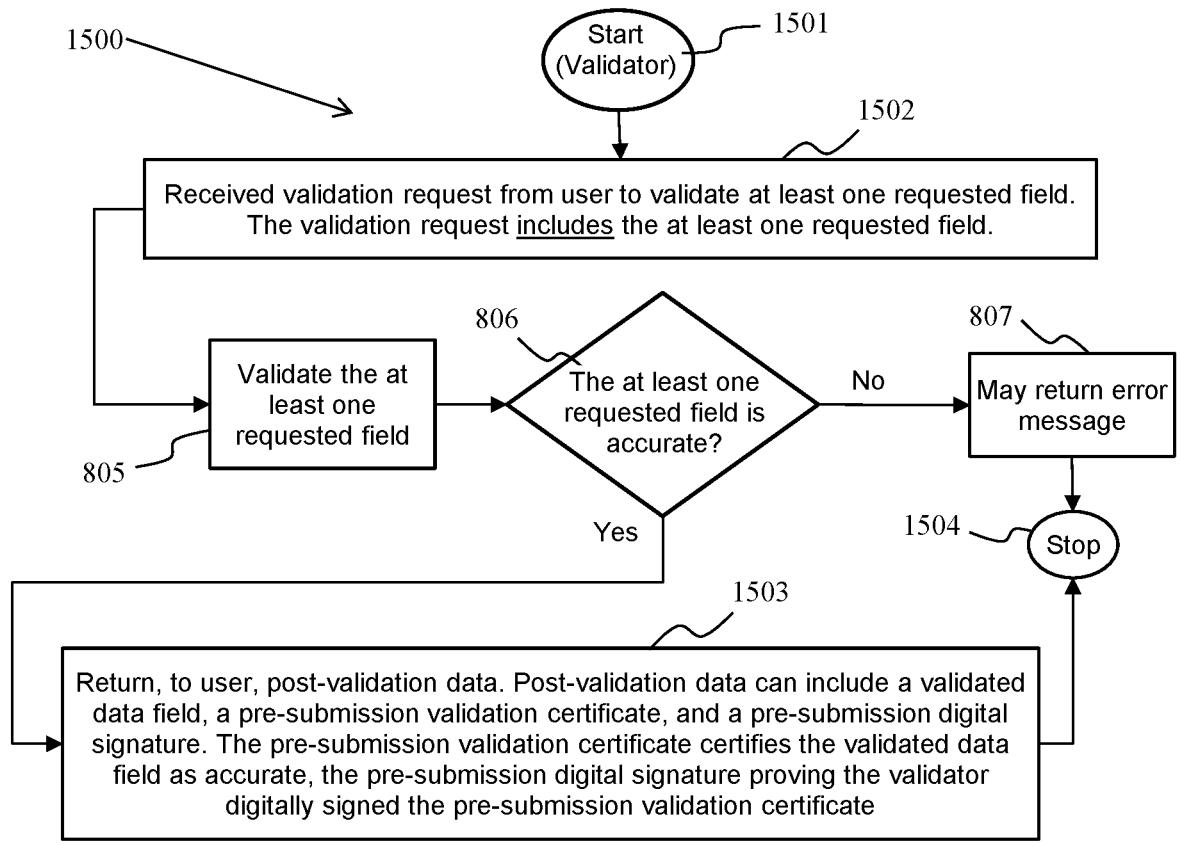
FIG. 15 is a flow chart illustrating an example of a method for producing post-validation data, according to embodiments disclosed herein.

FIG. 15 is a flow chart illustrating an example of a method for producing post-validation data 1500, according to embodiments disclosed herein. After the start, having received a validation request from a user for at least one requested field 1502 the validator can validate the at least one requested field 805. In this case, the validation request contains the requested fields such that the validator does not need to access the data store to attempt getting the requested fields, an attempt that would fail if the requested fields are not yet in the data store. A validator can validate by taking whatever steps are necessary to ensure that the requested fields are accurate. If the requested data fields are not accurate 806 then an error message may be sent to the user 807 before the process stops 1504. Otherwise, the user is provided with post-validation data 1503 before the method stops 1504. The post-validation data can include a validated data field, a pre-submission validation certificate, and a pre-submission digital signature. The pre-submission validation certificate certifies the validated data field as accurate, the pre-submission digital signature proving the validator digitally signed the pre-submission validation certificate. Pre-submission indicates that the requested data may not yet be stored on the data store. The validated data field can be in encrypted form and provided to the validator along with a decryption key.

Figure 16:
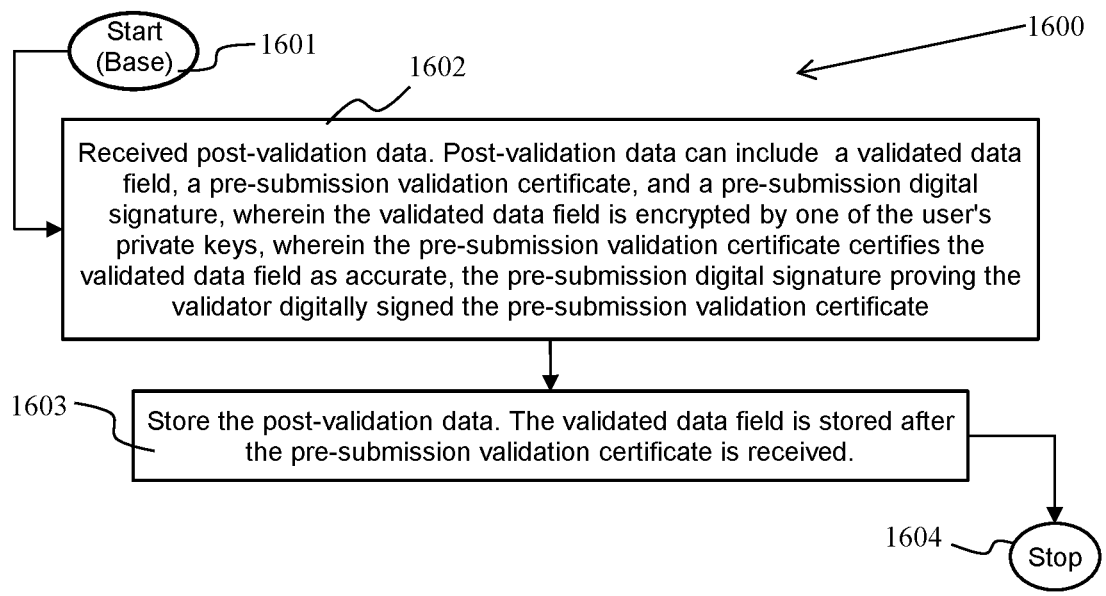
FIG. 16 is a flow chart illustrating an example of a method for storing post-validation data, according to embodiments disclosed herein.

FIG. 16 is a flow chart illustrating an example of a method for storing post-validation data 1600, according to embodiments disclosed herein. After the start 1601, having received the post-validation data 1602, the post-validation can be stored 1603 before the method stops 1604. The validated data field is not stored in the datastore before the post-validation data is received. The validated data field can be stored in the data store as an encrypted user data field after having been received with the post-validation data. The pre-submission validation certificate, and the pre-submission digital signature can be stored as any other validation data is stored.

Figure 17:
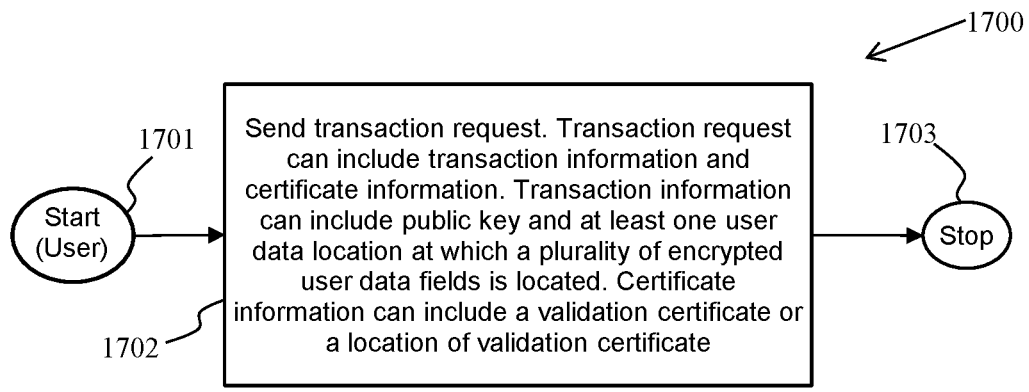
FIG. 17 is a flow chart illustrating an example of a method for sending a transaction request, according to embodiments disclosed herein.

FIG. 17 is a flow chart illustrating an example of a method for sending a transaction request 1700, according to embodiments disclosed herein. After the start 1701, a user can send a transaction request to a business 1702 before the method stops 1703. The transaction request can include transaction information and certificate information. Transaction information can include public keys and at least one user data location at which a plurality of encrypted user data fields is located. Certificate information can include a validation certificate or location of a validation certificate.

Figure 18:
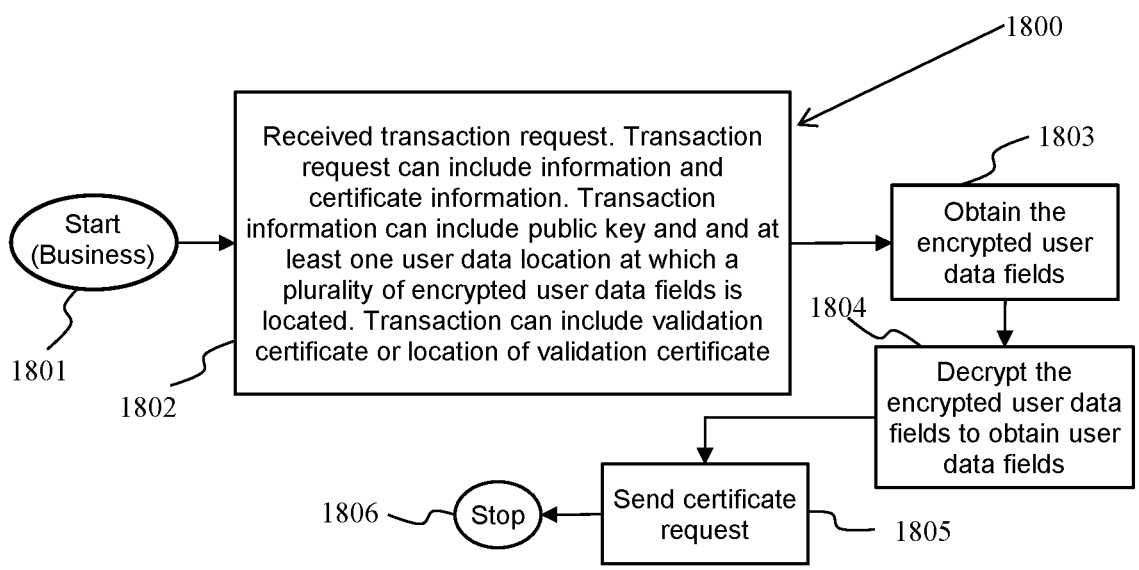
FIG. 18 is a flow chart illustrating an example of a method for processing a transaction request, according to embodiments disclosed herein.

FIG. 18 is a flow chart illustrating an example of a method for processing a transaction request 1800, according to embodiments disclosed herein. After the start 1801, having received a transaction request 1802 the business can obtain the encrypted user data fields 1803. The encrypted user data fields can be decrypted using the public keys provided by the user 1804. A certificate request can be sent 1805 before the method stops 1806. The certificate request can be received by the method of FIG. 14.

Figure 19:
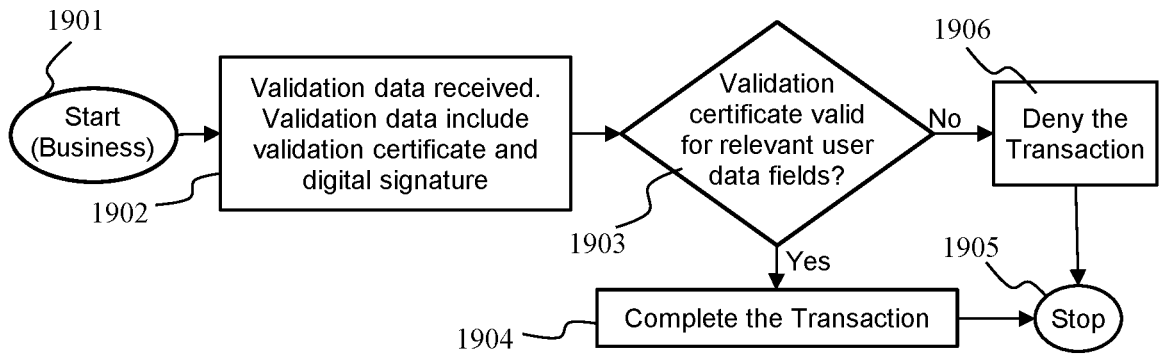
FIG. 19 is a flow chart illustrating an example of a method for completing a transaction request, according to embodiments disclosed herein.

FIG. 19 is a flow chart illustrating an example of a method for completing a transaction request 1800, according to embodiments disclosed herein. After starting 1901, having received the validation data 1902 that was requested at block 1805 of FIG. 18, the method can determine if the validation certificate is valid for relevant user data fields 1903, which can include ensuring that the validation certificate was signed by a trusted validator. If the validation certificate is valid for relevant user data fields 1903, the transaction can be completed 1904 before the method stops 1905. Otherwise, the transaction can be denied 1906 before the method stops 1905.

Figure 20:
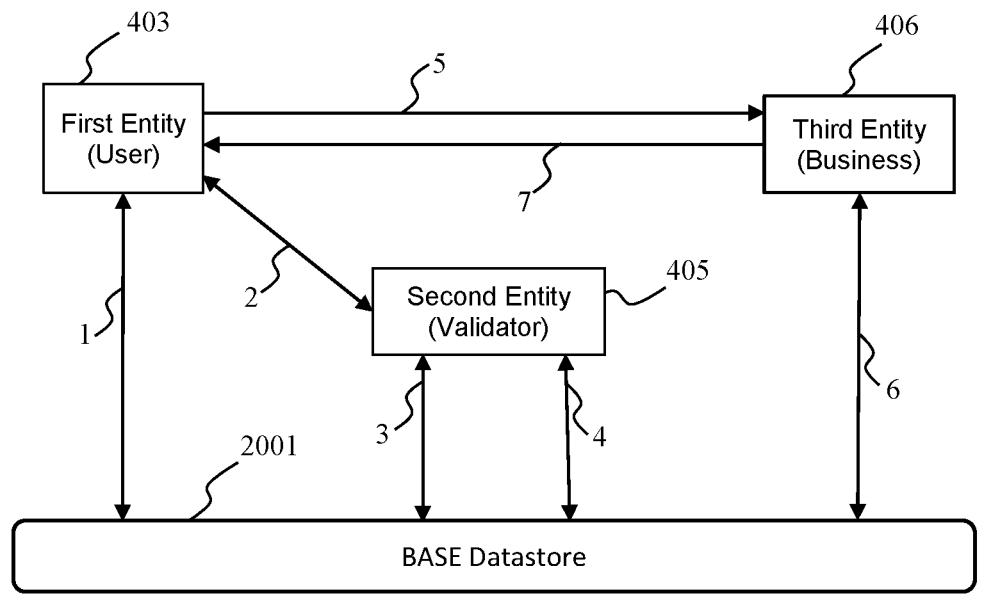
FIG. 20 illustrates a high-level view of an example of a data flow between main actors implementing methods for validating data and attesting to its accuracy in a secure distributed environment, according to embodiments disclosed herein.

FIG. 20 illustrates a high-level view of an example of a data flow between main actors implementing methods for validating data and attesting to its accuracy in a secure distributed environment, according to embodiments disclosed herein. The main actors include BASE, a user 403, a validator 405, and a business 406. BASE can store encrypted data in a BASE datastore 2001. Private keys can be kept secret by the main actors. BASE provides APIs for data sharing and users decide to whom they provide their data. The business 406 provides personalized offers and rewards for users or other businesses and can validates the authenticity of user data using validation certificates. The business 406 can executes smart contracts to ensure the certificate restrictions or other rules of the validation certificates are upheld. The validator 405 can be responsible for independent validation and certification of user data or business data. A validator can only act on data explicitly shared by users or businesses. The data can be shared with the validator 405 in an encrypted form using the validator's public key such that only the validator can decrypt it using the validator's private key. Users or businesses will generally have to pay a fee to the validator 405 for its services. Once data has been verified, the validator 405 generates a signed certificate of validity, the validation certificate. The validator may also generate a smart contract to be used in all transactions with a specific data/certificate pair. The validator 405 is a trusted and known entity who can be comparable to block validators in POS/POA blockchains. The validators 405 actions may be verified and the validator can be sued or punished for misbehavior.

The arrows of FIG. 20 are enumerated with numbers corresponding to the numbered steps in a data validation protocol given below:

1. Data Store: User 403 stores data item(s) in encrypted format item in BASE 2001. A data items can be decrypted with the public key of a key pair. Only the User (data owner) has access to the private key.
2. Validation Request: User 403 requests that Validator 405 (a validation service) validate and certify the data item(s). The User provides the necessary permissions to allow the validation service 405 to access the private data item(s). The User 403 may also request specific restrictions or limitations on the use of the provided certificate. These uses/restrictions can be codified by the validator in the form of a smart contract.
3. Retrieve User Data: Validation service 405 retrieves and independently validates user data item(s). A validation service may use a wide range of algorithms or any other means to determine the validity of a data item.
4. Store Validation Certificate: Validation service 405 generates a certificate of validity for the specific data item(s) and signs the certificate. Signing the certificate both ensures that future users can guarantee the origin of the certificate, and also guarantees that the contents of the certificate have not been tampered with. Based on user 403 or validator 405 imposed restrictions on the use of the data, the validator 405 can create a smart contract to be executed each time the certificate is used in a transaction. The validator 405 can associate and store the certification of validity and the smart contract with the user's data item in BASE.
5. Transaction Request: User 403 engages in a transaction request with business 406. The user 403 provides access to all necessary data items required to complete the transaction, including access to certifications of validity for the necessary data items.
6. User Data Validation: The business 406 retrieves user data and associated certificates of validity from BASE. The business 406 verifies the validity of the data by checking the associated signed certificates. As part of this transaction being processed on the blockchain, the associated smart contract is executed and performs whatever actions are coded for this certificate. As an example: If this data/certificate pair may only be used X times before expiring, the smart contract may require that a counter be updated and stored with the certificate. If/when that counter reaches its max value, the smart contract may terminate the transaction request as the certificate is no longer valid. Note that the certificates of validation and smart contracts only govern use of data within the BASE platform and cannot govern use/misuse of data outside of BASE. Terms-of-services and other legal requirements users and business agree to when they sign up for when using BASE can set restrictions on the use or sharing of data outside of the BASE platform.
7. Complete Transaction: Assuming all requirements are met and data item(s) are determined to be valid, the business 406 can complete the transaction with the user 403.

The methods and systems described herein relate to a communication protocol to achieve trusted and controlled validation of user data in an open and decentralized platform. Several mechanisms are combined in the embodiments to achieve fully verifiable data sharing between users and businesses. The mechanisms may include a combination of: a mechanism to store private and sensitive user data in an open but secure platform that allows users to engage in secure transactions; a mechanism to independently validate the correctness of data and to certify it as such; the ability to pre-certify user data through one or more validation services while maintaining user privacy/anonymity; a mechanism to share certificate(s) of validity with multiple, cascading, businesses while maintaining user privacy/anonymity; a mechanism to guarantee authenticity, through use of an immutable ledger and signed certificates of validity; a mechanism to set expiration horizons, usage restrictions, and data validity certificates; and a mechanism to validate data without gaining direct access to the original data (e.g. "does household income fall within a specific range" or "is user over 25 years old").

Regarding protection of data items, each individual data item stored by a user or a business in BASE can be encrypted with a unique key, and only the owner of the data has access to the private key required to decrypt it. These private keys are stored by the data owner and are not available to BASE (or anyone else). In order to gain access to a specific data item, the protocol uses standard public-key encryption methods: The requester must provide their public key to the data owner, the data owner will then decrypt the data using their own private key, re-encrypt it using the requesters public key and then share the data to the requester.

Regarding independent validation, BASE provides mechanisms to allow 3rd party service providers to independently validate and certify data. To avail of this system, a user or business can provide their data (e.g. "income level") or a request for data (e.g. "credit score") to the validator service. The validator service uses whatever processes and checks are necessary to obtain or confirm the correctness and validity of the data and then provide a signed certificate. The signed certificate is returned to the user and stored along with the data in BASE. A given data item may have multiple certificates of validation (e.g. "Credit Score" could be validated by multiple credit agencies). The trustworthiness (and hence "value") of an independent validator is based on their "reputation". Validators who do a poor job determining the validity of data items will be given poor ratings and over time will be used less and less by users of the BASE platform.

Regarding pre-certification of user data, any data item stored by a user or a business in BASE can be pre-certified by a 3rd party validator before the data is ever used in a transaction. This can be done at the time of data ingestion/first store in BASE, or can be done later at the data owners' convenience. The benefit of pre-certification is to speed up future transactions with businesses, as during the transaction, neither the user or the business has to worry about the validity of the data being shared.

Regarding sharing of certificates, the system provides a mechanism for a data owner to share certificates of validity of data with other businesses while maintaining privacy and control of the data. The data/certificate pairs are shared using public-key protocols (data owner encrypts the data/certificates with the recipient's public key so only they can decode it). As the data owner is in full control of which data items they share, they can maintain complete anonymity, if desired.

Regarding guarantee of authenticity, as all certificates are signed by the issuer of the certificate, they guarantee the authenticity and correctness of the data being certified. As the BASE platform is completely open, if at any point a validator service produces untrustworthy certificates, their "trust" within the system will be diminished and businesses/users will stop using them.

Regarding expiration horizons, BASE provides a mechanism to enforce a "validity horizon" on data to ensure the data is valid at the time of use. Expiration horizons can include but are not limited to: time period after initial certification, max use count, data shared a maximum number of times (hops), etc. This can be achieved by encoding specific information in the certificates of validity (e.g. expiration data) and by coding more complex rules as a smart contract that must be executed each time the data/certificate pair is used. Smart contracts allow the encoding of complex use rules such as: "Only allow the certificate to passed to and used by one additional business", or "Only allow this certificate to be used by businesses that meet criteria X". This allows both the user and the validators to maintain tight control of the use of their data within the BASE platform.

Regarding data validation while maintaining data privacy, because of the trusted and robust certification process for data, users and businesses have a mechanism to perform transactions without ever needing to gain access to the original "raw" data items. They can instead just rely on the certificates of validity as a guarantee that the data item meets some requirements/restrictions. For example: If a transaction requires that a user's credit-score be above a certain minimum value, the user can provide a certificate proving this without ever having to provide their actual credit score information (or other sensitive information—an SSN could have been required for the business to obtain and validate the credit-score themselves). This mechanism can determine and guarantee that a user's data meets necessary business constraints and can be applied to a wide range of data items.

An example of a car insurance coverage scenario using the steps of the data validation protocol of FIG. 20 is provided below:

1. Data Store: User stores personal data items necessary for purchase of new car insurance premium. All data is encrypted using user's private keys. The information stored includes, but is not limited to:
   Name, Address, Age, Gender
   Make, model of car
   Miles driven per year
   Driver's license and vehicle registration
   Information on any accidents in previous X years
2. Validation Request: User requests a 3rd party independent validation service to validate and certify the specific data items required for future insurance quotes. Access is granted by the user to the specific 3rd party data validator.
3. Retrieve User Data: The 3rd party validation service retrieves user data items and independently validates them using whatever mechanisms they deem appropriate and necessary. E.g.
   Use driver's license to check with DMV on user's personal information (name, address, age)
   Check whether there are any outstanding liens on vehicle
   Check whether vehicle has been involved in any accidents
4. Store Validation Certificate: 3rd party validation service stores certificates of validity with each of the user's data items in BASE. E.g. Validation may attest that:
   Users name, address and age are valid
   User has a clean driving record and no at-fault accidents for previous X years
   User is sole owner and driver of vehicle and averages 12K miles/year
   For each certified data item, the validation service may also provide "limits' on validity of certification: e.g.
   Clean driving record certificate is valid for 30 days
5. Transaction Request: User engages with potential insurance provider and requests a quote, providing access to the specific data items requested by the insurance company.
   The insurance provider does not have access to any other user information.
6. User Data Validation: The insurance provider retrieves provided user data and associated certificates. The insurance provider is assured that data is accurate and valid and so can make a fast decision on what quote to offer user.
7. Complete Transaction: The insurance provider provides quote to user and transaction can complete.

The above example describes a simple use case. The below example demonstrates the flexibility of the system design, allowing multiple validation services to certify all or subsets of the data and allowing certified data to be shared among multiple businesses, all under the user's control:

1. Data Store: User stores personal data items necessary for purchase of new car insurance premium. All data is encrypted using user's private keys. The information stored includes, but is not limited to:
   Name, Address, Age, Gender
   Make, model of car
   Miles driven per year
   Driver's license and vehicle registration
   Information on any accidents in previous X years
   Additional drivers in household
   Provide home or other insurance
2. Validation Request: User requests a 3rd party independent validation services to validate and certify the specific data items required for future insurance quotes. Access is granted by the user to the specific 3rd party data validators to give them access to users' private data. Some data items are validated by more than one validation service.
3. Retrieve User Data: The 3rd party validation services retrieve user data items and independently validate them using whatever mechanisms they deem appropriate and necessary. E.g.
   Use driver's license to check with DMV on user's personal information (name, address, age)
   Check whether there are any outstanding liens on vehicle
   Check whether vehicle has been involved in any accidents
   Each validation service provides a unique certificate for each validated data item. Data items validated by more than one validation service receive unique certificates from each validation provider.
4. Store Validation Certificate: 3rd party validation services store certificates of validity with each of the user's data items in BASE. E.g. Validation may attest that:
   Users name, address and age are valid
   User has a clean driving record and no at-fault accidents for previous X years
   User is sole owner and driver of vehicle and averages 12K miles/year
   For each certified data item, the validation services may also provide "limits' on validity of certification: e.g.
   Clean driving record certificate is valid for 30 days Household income is accurate to within "some range" e.g. "Greater than $100K per annum"
5. Transaction Request: User engages with potential insurance provider(s) and requests a quote. The user only provides very minimal information as part of the request process e.g. the user may choose to only share:
   Make/model of car
   Miles per year
And they may choose not to share the following:
   Name, address, age
   Driver's license etc.
Providing a controlled set of data gives the user confidence that:
   They get an initial quote based purely on the car make/model and miles driven
   The initial quote is not based on their location (perhaps a "bad" neighborhood), or older driving infractions.
By engaging with multiple providers, the user can choose the best option and continue the transaction
6. User Data Validation: The insurance provider retrieves provided user data and associated certificates. The insurance provider wishes to evaluate having coverage provided by a 3rd party. Based on restrictions set on validation certificate, user data and certificate can be shared with one additional business. The insurance provider is assured that data is accurate and valid and so can make a fast decision on what quote to offer user.
7. Complete Transaction: The insurance provider provides quote to user and the transaction can complete.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

While the above-described techniques are described in a general context, those skilled in the art will recognize that the above-described techniques may be implemented in software, hardware, firmware or any combination thereof. The above-described embodiments of the invention may also be implemented, for example, by operating a computer system to execute a sequence of machine-readable instructions. Typically, the computer readable instructions, when executed on one or more processors, implements a method. The instructions may reside in various types of computer readable media. In this respect, another aspect of the present invention concerns a programmed product, comprising a computer readable medium tangibly embodying a program of machine-readable instructions executable by a digital data processor to perform the method in accordance with an embodiment of the present invention. The computer readable media may comprise, for example, RAM (not shown) contained within the computer. Alternatively, the instructions may be contained in another computer readable media such as a magnetic data storage diskette and directly or indirectly accessed by a computer system. Whether contained in the computer system or elsewhere, the instructions may be stored on a variety of machine readable storage media, such as a DASD storage (e.g. a conventional "hard drive" or a RAID array), magnetic tape, electronic read-only memory, an optical storage device (e.g., CD ROM, WORM, DVD, digital optical tape), paper "punch" cards. In an illustrative embodiment of the invention, the machine-readable instructions may comprise lines of compiled C, C++, or similar language code commonly used by those skilled in the programming for this type of application arts.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the claims as described herein.

What is claimed is:

1. A method comprising:
   receiving a plurality of encrypted user data fields encrypted by a plurality of user private keys;
   storing the encrypted user data fields in a data store;
   providing at least one requested field to a validator in response to a data request, the data request specifying the at least one requested field, each of the at least one requested field being one of the encrypted user data fields;
   receiving validation data from the validator, the validation data comprising a validation certificate and a digital signature, the validation certificate certifying the at least one requested field as accurate, the digital signature proving the validator digitally signed the validation certificate;
   storing the validation data in the data store; and
   providing the validation data to a second entity in response to a certificate request requesting the validation data; wherein the validation certificate is at least one smart contract stored in an open public decentralized storage or on a blockchain maintained by a plurality of network nodes, and wherein one of the at least one smart contract is configured to, when executed by a blockchain VM, indicate if the validation certificate is valid.

2. The method of claim 1 further comprising:
   receiving a second certificate request requesting the validation data;
   determining that the validation certificate is invalid; and
   refusing to indicate the validation certificate is valid in response to the second certificate request.

3. The method of claim 2 wherein a smart contract determines that the validation certificate is invalid.

4. The method of claim 3 wherein the smart contract is stored in an open public decentralized storage or on a blockchain maintained by a plurality of network nodes.

5. The method of claim 1 wherein the data store is an open public decentralized storage or a blockchain maintained by a plurality of network nodes.

6. The method of claim 1 wherein the data store is a database.

7. The method of claim 1 wherein the validation certificate is configured to provide no more than a specified number of indications that the validation certificate is valid.

8. The method of claim 1 wherein the validation certificate specifies an expiration date and is configured to indicate that the validation certificate is invalid after the expiration date.

9. The method of claim 1 wherein the validation certificate comprises validation logic that indicates that the validation certificate is valid only if specified conditions are met, and wherein the specified conditions comprise:
the certificate request is submitted by a specific entity;
the certificate request is signed by the specific entity; and
a plurality of certificate requests is submitted by no more than N entities.

10. The method of claim 1 further comprising:
storing a reputation index associating a plurality of reputation scores in association with a plurality of validators;
adjusting the plurality of reputation scores based on a plurality of reputation inputs.

11. The method of claim 1 further comprising:
receiving post-validation data comprising a validated data field, a pre-submission validation certificate, and a pre-submission digital signature, wherein the validated data field is encrypted by one of the plurality of user private keys, wherein the pre-submission validation certificate certifies the validated data field as accurate, the pre-submission digital signature proving the validator digitally signed the pre-submission validation certificate;
storing the post-validation data in the data store wherein the validated data field is stored after the pre-submission validation certificate is received.

12. A method comprising:
receiving a validation request from a first entity to validate at least one requested field, the validation request comprising at least one user decryption key and at least one user data location at which a plurality of encrypted user data fields is located, the plurality of encrypted user data fields being stored in an open public decentralized storage or on a blockchain maintained by a plurality of network nodes;
obtaining at least one of the plurality of encrypted user data fields from the at least one user data location;
decrypting the at least one of the plurality of encrypted user data fields to obtain the at least one requested field;
validating the at least one requested field; and
storing a validation certificate in the open public decentralized storage or on the blockchain in association with a digital signature, the validation certificate certifying the at least one requested field as accurate, the digital signature proving a validator digitally signed the validation certificate;
wherein the validation certificate comprises a smart contract configured to, when executed by a blockchain VM, indicate if the validation certificate is valid.

13. The method of claim 12 further comprising:
receiving the plurality of encrypted user data fields encrypted by a plurality of user private keys;
storing the encrypted user data fields on the blockchain or the open public decentralized storage;
providing at least one desired field to a second validator in response to a data request, the data request specifying the at least one desired field, each of the at least one desired field being one of the encrypted user data fields;
receiving validation data from the second validator, the validation data comprising a second validation certificate and a second digital signature, the second validation certificate certifying the at least one desired field as accurate, the second digital signature proving the second validator digitally signed the second validation certificate;
storing the validation data on the blockchain or the open public decentralized storage; and
providing the validation data to a third entity in response to a certificate request requesting the validation data;
receiving a second certificate request requesting the validation data;
determining that the second validation certificate is invalid;
refusing to indicate the second validation certificate is valid in response to the second certificate request;
storing a reputation index associating a plurality of reputation scores in association with a plurality of validators;
adjusting the plurality of reputation scores based on a plurality of reputation inputs;
receiving post-validation data comprising a validated data field, a pre-submission validation certificate, and a pre-submission digital signature, wherein the validated data field is encrypted by one of the plurality of user private keys, wherein the pre-submission validation certificate certifies the validated data field as accurate, the pre-submission digital signature proving the validator digitally signed the pre-submission validation certificate;
storing the post-validation data on the blockchain or the open public decentralized storage wherein the validated data field is stored after the pre-submission validation certificate is received;
wherein the validation certificate is a plurality of smart contracts;
wherein the validation certificate is configured to, when executed by the blockchain VM, indicate if the validation certificate is valid;
wherein the validation certificate is configured to provide no more than a specified number of indications that the validation certificate is valid;
wherein the validation certificate specifies an expiration date and is configured to indicate that the validation certificate is invalid after the expiration date; and
wherein the validation certificate comprises validation logic that indicates that the validation certificate is valid only if specified conditions are met, and wherein the specified conditions comprise the certificate request being submitted by a specific entity, the certificate request being signed by the specific entity, and a plurality of certificate requests are submitted by no more than N entities.

14. A non-transitory computer readable medium storing computer readable instructions, that when executed on one or more processors, implements a method comprising:
receiving a plurality of encrypted user data fields encrypted by a plurality of user private keys;
storing the encrypted user data fields in a data store;
providing at least one requested field to a validator in response to a data request, the data request specifying the at least one requested field, each of the at least one requested field being one of the encrypted user data fields;
receiving validation data from the validator, the validation data comprising a validation certificate and a digital signature, the validation certificate certifying the at least one requested field as accurate, the digital signature proving the validator digitally signed the validation certificate;
storing the validation data in the data store;

providing the validation data to a second entity in response to a certificate request requesting the validation data;
receiving a second certificate request requesting the validation data;
determining that the validation certificate is invalid; and
refusing to indicate the validation certificate is valid in response to the second certificate request;
wherein the validation certificate is at least one smart contract stored is an open public decentralized storage or on a blockchain maintained by a plurality of network nodes, and wherein the validation certificate is configured to, when executed by a blockchain VM, indicate if the validation certificate is valid.

15. The computer readable medium storing computer readable instructions of claim 14, wherein a smart contract determines that the validation certificate is invalid.

16. The computer readable medium storing computer readable instructions of claim 14, wherein the validation certificate is configured to provide no more than a specified number of indications that the validation certificate is valid.

17. The computer readable medium storing computer readable instructions of claim 14 wherein the validation certificate specifies an expiration date and is configured to indicate that the validation certificate is invalid after the expiration date.

* * * * *